(12) United States Patent
Kim et al.

(10) Patent No.: US 12,176,839 B2
(45) Date of Patent: Dec. 24, 2024

(54) MOTOR ASSEMBLY AND METHOD FOR CONTROLLING MOTOR ASSEMBLY

(71) Applicant: LG ELECTRONICS INC., Seoul (KR)

(72) Inventors: Suntae Kim, Seoul (KR); Bohwan Seo, Seoul (KR); Jiyoun Jeong, Seoul (KR); Seungjoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 17/790,690

(22) PCT Filed: Mar. 20, 2020

(86) PCT No.: PCT/KR2020/003828
§ 371 (c)(1),
(2) Date: Jul. 1, 2022

(87) PCT Pub. No.: WO2021/145508
PCT Pub. Date: Jul. 22, 2021

(65) Prior Publication Data
US 2023/0039050 A1    Feb. 9, 2023

(30) Foreign Application Priority Data
Jan. 13, 2020 (KR) .................. 10-2020-0004231

(51) Int. Cl.
*H02P 27/06* (2006.01)
*H02P 21/10* (2016.01)
(Continued)

(52) U.S. Cl.
CPC .............. *H02P 29/50* (2016.02); *H02P 25/22* (2013.01); *H02P 27/08* (2013.01)

(58) Field of Classification Search
CPC .................................. H02P 21/24; H02P 1/46
See application file for complete search history.

(56) References Cited

U.S. PATENT DOCUMENTS

2006/0192390 A1    8/2006  Saragueta et al.
2006/0192522 A1*   8/2006  Kerkman ................ H02M 7/48
                                                    318/812
(Continued)

FOREIGN PATENT DOCUMENTS

KR    10-2018-0059592    6/2018

OTHER PUBLICATIONS

Graditi, G. et al. Combined synchronized PWM for dual neutral-clamped converters for asymmetrical split-phase traction drive. In: SPEEDAM 2010. Jun. 14-16, 2010.
(Continued)

*Primary Examiner* — Kawing Chan
*Assistant Examiner* — Charles S Laughlin
(74) *Attorney, Agent, or Firm* — KED & Associates LLP

(57) ABSTRACT

A motor assembly may include a stator; a first inverter unit for controlling a three-phase alternating current which is applied to a first coil in order to generate a rotation magnetic field; and a second inverter unit for controlling a three-phase alternating current which is applied to a second coil in order to generate a rotation magnetic field. Control signals for turning on and off the three-phase alternating currents applied to the first coil and the second coil are generated so as to be left-right symmetric by the first inverter unit and the second inverter unit during a preset switching cycle.

15 Claims, 7 Drawing Sheets

(51) Int. Cl.
*H02P 25/22* (2006.01)
*H02P 27/08* (2006.01)
*H02P 29/50* (2016.01)

(56) References Cited

U.S. PATENT DOCUMENTS

2008/0049460 A1* 2/2008 Mohan .................. H02M 5/271
363/34
2012/0049782 A1* 3/2012 Suzuki .................. H02M 7/493
318/807

OTHER PUBLICATIONS

Baiju, M.R. et al. A dual two-level inverter scheme with common mode voltage elimination for an induction motor drive, IEEE Transactions on Power Electronics, May 10, 2004, vol. 19, Issue. 3, pp. 794-805.
Ariff, Engku Ahmad Rafiqi Engku et al. A Space Vector PWM Technique for a Three-Level Symmetrical Six-Phase Drive, IEEE Transactions on Industrial Electronics, Jun. 1, 2017, vol. 64, Issue. 11, pp. 8396-8405.
International Search Report dated Oct. 12, 2020 issued in Application No. PCT/KR2020/003828.

* cited by examiner (a)

(b)

(c)

MOTOR ASSEMBLY AND METHOD FOR CONTROLLING MOTOR ASSEMBLY

CROSS-REFERENCE TO RELATED PATENT APPLICATIONS

This application is a U.S. National Stage Application under 35 U.S.C. § 371 of PCT Application No. PCT/KR2020/003828, filed Mar. 20, 2020, which claims priority to Korean Patent Application No. 10-2020-0004231, filed Jan. 13, 2020, whose entire disclosures are hereby incorporated by reference.

TECHNICAL FIELD

The present disclosure relates to a three-phase double-winding motor assembly, and more particularly to a technology for calculating dwell times of active voltage vectors of a three-phase double-winding synchronous motor using a space vector pulse width modulation (SVPWM) method, and thus improving harmonic waves (harmonics) through a symmetric structure of a pulse width modulation (PWM) pattern.

BACKGROUND ART

A rotation magnetic field created by three coils and three-phase alternating current (AC) is called a three-phase rotation magnetic field, and is used in three-phase induction motors and three-phase synchronous motors. In more detail, three coils having the same number of turns, the same size, and the same performance are arranged at 120° intervals from the center point of the motor, and each phase current of three-phase alternating current (AC) flows through each coil, resulting in formation of a three-phase rotation magnetic field.

Similarly, a six-phase motor can be used through six-phase windings, but in general, a three-phase double-winding motor (also called a dual three-phase motor) designed to use a three-phase alternating current (AC) of a double-winding method in which one inverter controls one three-phase current using a dual inverter system can be used.

The above-described motors have been used in high-speed elevators, submarines, aircraft, vehicles, etc. requiring high-stability driving. In more detail, if one inverter fails, the motor can be driven with the other inverter, such that the motor can be driven even in an emergency such as a failure or the like. That is, the three-phase double-winding motor is used at a place where there is a need for the motor to stably operate.

Cited Reference 1 (Zhao, Yifan, and Thomas A. Lipo. Space vector PWM control of dual three-phase induction machine using vector space decomposition, IEEE Transactions on Industry Applications, Vol. 31(5), pp. 1100-1109, 1995) has disclosed a space vector pulse width modulation (SVPWM) method using vector space decomposition to control a three-phase double-winding motor. That is, two independent planes, i.e., the d-q plane (i.e., a plane consisting of the d-axis and the q-axis) and the z-plane (i.e., the z-axis consisting of z1 and z2 of the z-axis or the n-axis corresponding to a neutral axis or an imaging axis), from which interference components are removed by modeling a total of 6-phase windings are created using a space vector. Then, four synthetic vectors are used to calculate a total of four independent values including the d-axis and q-axis values that are used to control each inverter. The ON time of the corresponding four synthetic vectors may be calculated through the inverse matrix obtained by calculating the size of each coordinate axis.

However, according to a vector space decomposition scheme, each synthetic vector must be synthesized through two adjacent inverter vectors to represent a total of four synthetic vectors, so that a total of five inverter vectors should be used. In this case, whereas two inverter vectors are selected in one inverter from among two inverters, three inverter vectors should be selected from the other inverter. Therefore, when three inverter vectors are selected, it is impossible to create a symmetrical switching pattern.

When the symmetrical switching pattern is not created, the ON time of the corresponding synthetic vector should be calculated through the corresponding four selected synthetic vectors. That is, since the inverse matrix of a (5×5) matrix (including 5 rows and 5 columns) should be calculated, the amount of computation increases. As a result, a switching cycle required for securing the operation time may also increase.

Cited Reference 2 (Liu, Jian., Yang, Guijie., Su, Jianyoung., and Yang, Jinbo. An improved vector control method for dual three phase PMSG, Proceedings of The 7th International Power Electronics and Motion Control Conference, Vol. 2, pp. 1252-1256, 2012) has disclosed a method in which the d-q plane remains unchanged in order to make the switching pattern symmetrical and vector control in the z-plane is abandoned. That is, only a voltage reference vector of the d-q plane can be normally modulated and output, resulting in formation of a symmetrical switching pattern.

However, there is a problem that harmonic waves (harmonics) occurring in the z plane cannot be predicted because vector control in the z-plane is abandoned.

DISCLOSURE

Technical Problem

The present disclosure provides a motor assembly and a method for controlling the same in which a total of four inverter vectors (i.e., two inverter vectors selected by one inverter and two inverter vectors selected by the other inverter) instead of synthetic vectors of space vectors are selected by the inverters, so that a switching pattern in the space vector pulse width modulation (SVPWM) scheme can be formed in a symmetrical shape in the same manner as in a three-phase SVPWM scheme.

The present disclosure provides a motor assembly and a method for controlling the same in which distribution of vectors (i.e., vector patterns) in the z-plane is sorted and stored for each case, so that a matrix obtained by calculation of an inverse matrix is used, resulting in reduction of a total calculation time.

The present disclosure provides a motor assembly capable of reducing harmonic waves (harmonics) by generating a symmetrical switching pattern compared to an asymmetric switching pattern, and provides a method for controlling the motor assembly.

The present disclosure provides a motor assembly capable of reducing a switching cycle by reducing the amount of computation of a three-phase double-winding motor, and a method for controlling the same.

The present disclosure provides a motor assembly capable of modulating a desired vector in all axes (d-axis, q-axis, and z-axis) in consideration of the z-axis, and a method for controlling the same.

Technical Solutions

In order to address the above issues, a voltage reference vector for rotating the dual three-phase motor may allow a switching function (indicating the on/off times of a switching element included in each inverter) to be formed in a symmetrical shape within a predetermined time cycle using a total of four active voltage vectors (consisting of two active voltage vectors selected from one inverter and two active voltage vectors selected from the other inverter) selected from two independent inverters.

That is, since two typical inverters capable of controlling three-phase alternating current are used, a dwell time of each space voltage vector designed to use two active voltage vectors and zero voltage vectors is generated in a left-right symmetrical shape within the switching cycle in the same manner as in three-phase alternating current.

In accordance with an aspect of the present disclosure, a motor assembly may include a stator having a plurality of slots, a first coil and a second coil isolated from the first coil, each of which is wound on each of the plurality of slots such that three-phase alternating currents are applied thereto, a rotor configured to rotate by rotation magnetic fields generated by the first coil and the second coil, a first inverter unit configured to control the three-phase alternating current that is applied to the first coil in order to generate the rotation magnetic field, and a second inverter unit configured to control the three-phase alternating current that is applied to the second coil in order to generate the rotation magnetic field, wherein the first inverter unit and the second inverter unit are configured such that control signals for turning on or off each three-phase alternating current applied to each of the first coil and the second coil are generated in a left-right symmetrical shape during a preset switching cycle.

The second coil may have a phase difference of 30 degrees or −30 degrees with respect to the first coil.

The motor assembly may further include a first winding, a second winding, and a third winding, each of which is configured to receive each single-phase alternating current of each of the three-phase alternating currents applied to the first coil and the second coil. In this case, one winding may be disposed in each of the plurality of slots, and single-phase windings of the first coil and the second coil may be alternately arranged in the plurality of slots in a manner that the single-phase windings corresponding to each other are alternately arranged in the plurality of slots.

Each of the first inverter unit and the second inverter unit may include a first-phase switching unit, a second-phase switching unit, and a third-phase switching unit, each of which applies one single-phase alternating current from among three-phase alternating currents to a corresponding winding. The control signals may be signals for turning on or off the first-phase switching unit, the second-phase switching unit, and the three-phase switching element according to a space vector pulse width modulation scheme.

Voltages, which are applied to single-phase windings of the first coil and the second coil according to on/off states of the first-phase switching unit, the second-phase switching unit, and the third-phase switching unit, may be generated to have a left-right symmetrical shape during the switching cycle.

The voltage reference vector for rotating the rotor may be formed using two active voltage vectors and two zero voltage vectors that are adjacent to the voltage reference vector in each of a first space voltage vector indicating a space vector of the first inverter unit and a second space voltage vector indicating a space vector of the second inverter unit.

In the first space voltage vector, the sum of a first dwell time and a second dwell time for which two active voltage vectors adjacent to the voltage reference vector are respectively applied, and a third dwell time for which the zero voltage vectors are applied, may be half of the switching cycle.

In the second space voltage vector, the sum of a fourth dwell time and a fifth dwell time for which two active voltage vectors adjacent to the voltage reference vector are respectively applied, and a sixth dwell time for which the zero voltage vectors are applied, may be half of the switching cycle.

The control signals, which are configured to turn on or off the first-phase switching unit of the first inverter unit, the second-phase switching unit of the first inverter unit, and the third-phase switching unit of the first inverter unit according to the first dwell time, the second dwell time, and the third dwell time, are generated in a left-right symmetrical shape during the switching cycle.

In addition, the control signals, which are configured to turn on or off the first-phase switching unit of the second inverter unit, the second-phase switching unit of the second inverter unit, and the third-phase switching unit of the second inverter unit according to the fourth dwell time, the fifth dwell time, and the sixth dwell time, are generated in a left-right symmetrical shape during the switching cycle.

Meanwhile, voltages, which are applied to windings for each phase of the first coil and the second coil in response to control signals for turning on or off the first-phase switching unit, the second-phase switching unit, and the third-phase switching unit according to the first dwell time, the second dwell time, and the third dwell time, may be generated in a left-right symmetrical shape during the switching cycle.

In addition, voltages, which are applied to windings for each phase of the first coil and the second coil in response to control signals for turning on or off the first-phase switching unit, the second-phase switching unit, and the third-phase switching unit according to the fourth dwell time, the fifth dwell time, and the sixth dwell time, may be generated in a left-right symmetrical shape during the switching cycle.

The voltage reference vector for rotating the rotor may allow two active voltage vectors adjacent to the voltage reference vector in the first space voltage vector indicating a space vector of the first inverter unit to be located at the center point during the switching cycle.

The voltage reference vector for rotating the rotor may allow two active voltage vectors adjacent to the voltage reference vector in the second space voltage vector indicating a space vector of the second inverter unit to be located at the center point during the switching cycle.

In accordance with another aspect of the present disclosure, a method for controlling a motor assembly may include applying a voltage reference vector based on space vector pulse width modulation (SVPWM) control, determining a magnitude and angle of the voltage reference vector in a d-q plane, determining a sector in which the voltage reference vector is currently located by referring to the angle of the voltage reference vector, from among 12 sectors distinguished from each other by a first space voltage vector of the first inverter unit and a second space voltage vector of the second inverter unit in the d-q plane, calculating, according to which sector includes the voltage reference vector, dwell times of active voltage vectors and zero voltage vectors required for rotation of the rotor from among first space voltage vectors and second space voltage vectors, and turning on or off the switching unit of the first inverter unit and the switching unit of the second inverter unit in order to generate space voltage vectors required for the calculated dwell times.

In this case, when the voltage reference vector is located at a point corresponding to a $(3n-1)^{-th}$ sector (where, n=1, 2, 3, 4), the motor control method may calculate dwell times of active voltage vectors from among the first space voltage vectors and dwell times of active voltage vectors from among the second space voltage vectors by referring to Equation 1.

When the voltage reference vector is located at a point corresponding to a $(3n-2)^{-th}$ sector (where, n=1, 2, 3, 4), the motor control method may calculate dwell times of active voltage vectors from among the first space voltage vectors and dwell times of active voltage vectors from among the second space voltage vectors by referring to Equation 2.

When the voltage reference vector is located at a point corresponding to a $(3n)^{-th}$ sector (where, n=1, 2, 3, 4), the motor control method may calculate dwell times of active voltage vectors from among the first space voltage vectors and dwell times of active voltage vectors from among the second space voltage vectors by referring to Equation 3.

$$\begin{bmatrix} T_a \\ T_b \\ T_c \\ T_d \end{bmatrix} = \begin{bmatrix} \frac{1}{2} & -\frac{\sqrt{3}}{6} & \frac{1}{2} & \frac{\sqrt{3}}{6} \\ \frac{\sqrt{3}}{3} & 0 & -\frac{\sqrt{3}}{3} & 0 \\ 0 & \frac{\sqrt{3}}{3} & 0 & -\frac{\sqrt{3}}{3} \\ -\frac{\sqrt{3}}{6} & \frac{1}{2} & \frac{\sqrt{3}}{6} & \frac{1}{2} \end{bmatrix} \begin{bmatrix} V_{mi}\cos\theta \\ V_{mi}\sin\theta \\ 0 \\ 0 \end{bmatrix}$$ [Equation 1]

$$\begin{bmatrix} T_a \\ T_b \\ T_c \\ T_d \end{bmatrix} = \begin{bmatrix} \frac{1}{2} & -\frac{\sqrt{3}}{6} & -\frac{1}{2} & \frac{\sqrt{3}}{6} \\ \frac{\sqrt{3}}{3} & 0 & \frac{\sqrt{3}}{6} & -\frac{1}{2} \\ 0 & \frac{\sqrt{3}}{3} & \frac{1}{2} & -\frac{\sqrt{3}}{6} \\ -\frac{\sqrt{3}}{6} & \frac{1}{2} & -\frac{\sqrt{3}}{3} & 0 \end{bmatrix} \begin{bmatrix} V_{mi}\cos\theta \\ V_{mi}\sin\theta \\ 0 \\ 0 \end{bmatrix}$$ [Equation 2]

$$\begin{bmatrix} T_a \\ T_b \\ T_c \\ T_d \end{bmatrix} = \begin{bmatrix} \frac{1}{2} & -\frac{\sqrt{3}}{6} & 0 & -\frac{\sqrt{3}}{3} \\ \frac{\sqrt{3}}{3} & 0 & -\frac{\sqrt{3}}{6} & \frac{1}{2} \\ 0 & \frac{\sqrt{3}}{3} & -\frac{1}{2} & \frac{\sqrt{3}}{6} \\ -\frac{\sqrt{3}}{6} & \frac{1}{2} & \frac{\sqrt{3}}{6} & -\frac{1}{2} \end{bmatrix} \begin{bmatrix} V_{mi}\cos\theta \\ V_{mi}\sin\theta \\ 0 \\ 0 \end{bmatrix}$$ [Equation 3]

Advantageous Effects

The present disclosure provides a motor assembly and a method for controlling the same in which a total of four inverter vectors (i.e., two inverter vectors selected by one inverter and two inverter vectors selected by the other inverter) instead of synthetic vectors of the space vectors are selected by the inverters, so that a switching pattern in the space vector pulse width modulation (SVPWM) scheme can be formed in a symmetrical shape in the same manner as in a three-phase SVPWM scheme.

The present disclosure provides a motor assembly and a method for controlling the same in which distribution of vectors (i.e., vector patterns) in the z-plane is sorted and stored for each case, so that a matrix obtained by calculation of an inverse matrix for each case is used, resulting in reduction of a total calculation time.

The present disclosure provides a motor assembly capable of reducing harmonic waves (harmonics) by generating a symmetrical switching pattern compared to an asymmetric switching pattern, and provides a method for controlling the motor assembly.

The present disclosure provides a motor assembly capable of reducing a switching cycle by reducing the amount of computation of a three-phase double-winding motor, and a method for controlling the same.

The present disclosure provides a motor assembly capable of modulating a desired vector on all axes (d-axis, q-axis, and z-axis) in consideration of the z-axis, and a method for controlling the same.

BEST MODE

Figure 1:
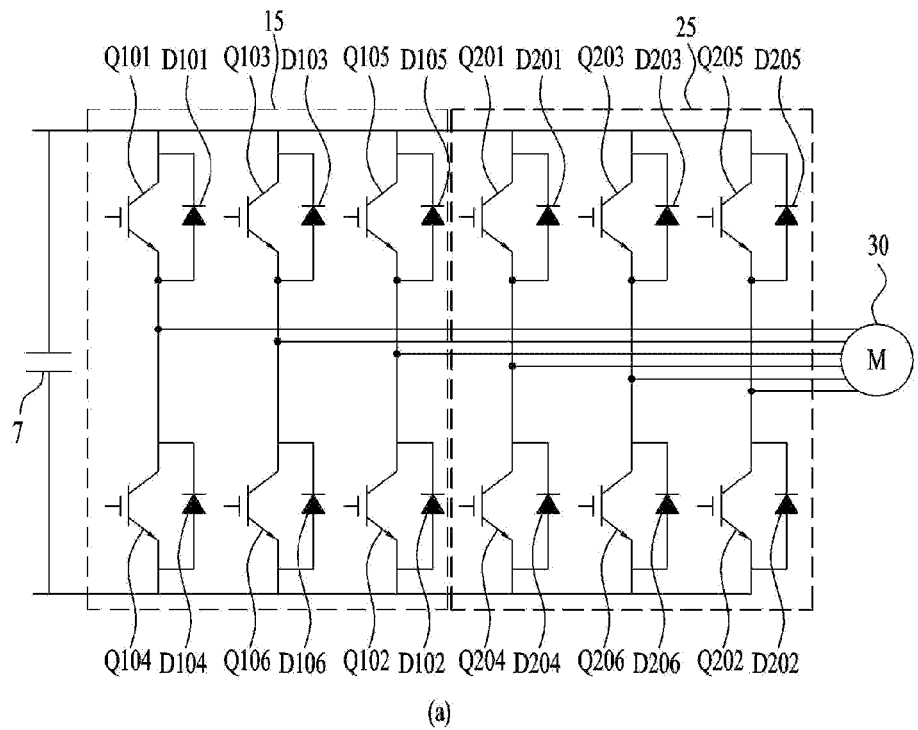
FIG. 1(a) is a circuit diagram illustrating a circuit in which two inverters are connected to a general three-phase double-winding motor.
FIG. 1(b) schematically illustrates the appearance of two coils wound on the motor and terminals respectively connected to the coils.
FIG. 1(c) illustrates the modeling appearance of winding arrangement of a three-phase double-winding motor.
Figure 1:
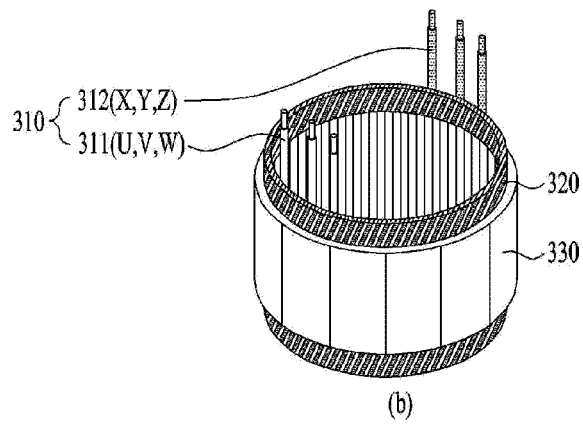
Figure 1:
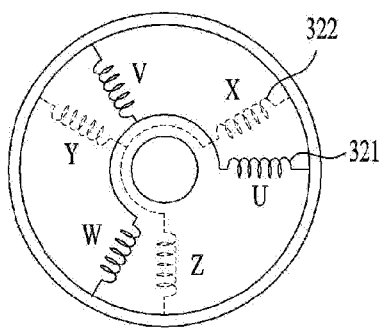

Reference will now be made in detail to the embodiments of the present disclosure, examples of which are illustrated in the accompanying drawings. The configuration or control method of the apparatus to be described below is only for explaining the embodiments of the present disclosure and not for limiting the scope of the present disclosure. Throughout the disclosure, like reference numerals refer to like parts throughout the various figures and embodiments of the present disclosure.

Specific terminology used in this specification is only for convenience of description and is not intended to be limiting of the illustrative embodiments. For example, expressions such as "same" and "identical" not only indicate the strictly identical state, but also indicate a state in which a tolerance or a difference in the degree of obtaining the same function exists. In addition, expressions such as "symmetry" indicate not only strictly mathematical symmetry, but also a state in which a difference exists to some extent in consideration of errors, noise, etc. depending on the sampling time that inevitably appears in the case of experimental observation or analysis.

FIG. 1(a) is a circuit diagram illustrating a circuit in which two inverters are connected to a general three-phase double-winding motor. FIG. 1(b) schematically illustrates the appearance of two coils wound on the motor and terminals respectively connected to the coils. FIG. 1(c) illustrates the modeling appearance of winding arrangement of a three-phase double-winding motor.

A typical AC motor includes an induction motor and a synchronous motor. The induction motor and the synchronous motor are designed to rotate their rotors by a magnetic field rotating by their stators, and this magnetic field is referred to as a rotation magnetic field. The motors designed to use the rotation magnetic field include induction motors and synchronous motors. The induction motor is a motor that generates an induced current in the rotor by the rotation magnetic field of the stator and rotates by electromagnetic force of the induced current. On the other hand, the synchronous motor rotates a rotor thereof by magnetic attractive force and repulsive force generated by the rotation magnetic field of the rotor.

There are two types of AC motors, one type of AC motor designed to use a three-phase AC as a power source and the other type of AC motor designed to use a single-phase AC as a power source. Generally, the AC motors may also be referred to as three-phase induction motors, three-phase synchronous motors, etc. according to the principle of rotation.

In particular, a rotation magnetic field generated using a three-phase alternating current (AC) is referred to as a three-phase rotation magnetic field. In the case of the AC motor, the rotation magnetic field is created by a fixed electromagnet. At this time, the magnetic field formed by three coils and the three-phase AC is referred to as a three-phase rotation magnetic field, and the three-phase rotation magnetic field is used in three-phase induction motors and the three-phase synchronous motors.

Three coils having the same number of turns, the same size, and the same performance are arranged at 120° intervals from the center point of the motor, and each phase current of three-phase alternating current (AC) flows through each coil, resulting in formation of a three-phase rotation magnetic field. The magnetic field of each coil becomes the same phase as the flowing single-phase AC, and is formed in a sinusoidal curve (sine curve).

The respective coils are arranged in a manner that the current flows through the coils in strong and weak manners and the reversal of magnetic poles is repeated. The coils are spaced apart from each other at intervals of a phase difference of 120° and the three-phase alternating currents flowing through the coils have a phase difference of 120° therebetween. Thus, the directions of composite magnetic fields created by magnetic fields of the coils can be sequentially changed.

In the induction motor, the AC power is supplied only to three-phase stator windings. The three-phase windings made of insulated copper (Cu) wire are arranged at 120° (120 electrical degrees) intervals in several slots of the stator core. Typically, the three-phase windings are Y-connected to each other (Y-connection) in a high voltage, and are Δ-connected to each other (Δ-connection) in a low voltage. However, this is only an example and the scope of the present disclosure is not limited thereto.

FIG. 1(a) is a schematic diagram illustrating a portion of a circuit diagram including not only inverter units 15 and 25 for converting DC power into AC power and supplying the AC power to a six-phase motor, but also a circuit diagram of the six-phase motor. Specifically, the six-phase motor is a three-phase double-winding motor assembly 30 (hereinafter referred to as a motor) controlled by the first inverter unit 15 and the second inverter unit 25, each of which supplies the three-phase AC. In more detail, the 6-phase motor is configured in a manner that inverter units 15 and 25, each of which includes two three-phase inverters respectively controlling two three-phase winding coils, are connected to each other.

Each of the first inverter 15 and the second inverter 25 may include a three-phase inverter, which is a power conversion device that generates AC power having a predetermined voltage and frequency upon receiving constant or variable DC power (not shown). The three-phase inverters may be arranged in any format as long as they can control the three-phase double-winding motor 30 or a motor having a total of six phases. That is, each of the first inverter unit 15 and the second inverter unit 25 may be connected to the motor independently or separately. Alternatively, and the first inverter unit 15 and the second inverter unit 25 may be integrated and then connected to the motor.

In addition, the first inverter unit 15 and the second inverter unit 25 may be embedded in the motor 30. Alternatively, the first inverter unit 15 and the second inverter unit 25 may be located outside the motor and may then control the motor. Therefore, the above-described structures will hereinafter be collectively referred to as a motor assembly for convenience of description. That is, the motor assembly may conceptually include a motor composed of a coil, a stator, and a rotor, and first and second inverters for controlling the coil, stator, and rotor of the motor. Thus, even when the inverter units are included in the motor, the resultant motor including the inverter units may also be referred to as a motor assembly.

In FIG. 1(a), a capacitor 7 is connected in parallel between a DC power source (not shown) and an input stage of the first inverter 15 and the second inverter 25 in order to constantly maintain a DC power voltage. For DC power to be input to the first inverter unit 15 and the second inverter unit 25, AC power is generally converted into DC power through the rectifier so that the DC power can be supplied to the motor assembly. In addition, a distributed power source such as a battery has recently been used.

Also, the inverter unit may include a controller (not shown) called a motor control unit (MCU). In this case, the controller may sense the current or position of the motor, may perform calculation required for space vector pulse width modulation (SVPWM), and may turn on or off the switching elements of the inverters based on the result of calculation. Alternatively, the controller may be located outside the inverter units so that the motor 30 can also be controlled through a microcontroller or the like.

The control method according to the present disclosure can be applied to various motors with or without a current sensor, a speed sensor, or a position sensor for detecting the speed or position of the motors. In addition, the control method according to the present disclosure can also be applied to synchronous motors and/or asynchronous motors as necessary.

In order to generate and control one single-phase AC using the inverter units 15 and 25 as shown in FIG. 1(a), two switching elements (also called two switching devices) are required for each single phase. In this case, the three-phase AC includes alternating currents of three phases, i.e., a first-phase AC, a second-phase AC, and a third-phase AC, which may have a phase difference of 120° therebetween.

The first-phase AC of the first inverter unit 15, for example, the U-phase AC from among the three-phase (U-phase, V-phase, W-phase) ACs of the first inverter unit 15, may be generated by the first-phase switching unit (composed of two switching elements Q101 and Q104) of the first inverter unit 15. The second-phase AC of the first inverter unit 15, for example, the V-phase AC from among the three-phase (U-phase, V-phase, W-phase) ACs of the first inverter unit 15, may be generated by the second-phase switching unit (composed of two switching elements Q103 and Q106) of the first inverter unit 15. The third-phase AC of the first inverter unit 15, for example, the W-phase AC from among the three-phase (U-phase, V-phase, W-phase) ACs of the first inverter unit 15, may be generated by the third-phase switching unit (composed of two switching elements Q105 and Q102) of the first inverter unit 15.

In addition, the first-phase AC of the second inverter unit 25, for example, the X-phase AC from among the three-phase (X-phase, Y-phase, Z-phase) ACs of the second inverter unit 25, may be generated by the first-phase switching unit (composed of two switching elements Q201 and Q204) of the second inverter unit 25. The second-phase AC of the second inverter unit 25, for example, the Y-phase AC from among the three-phase (X-phase, Y-phase, Z-phase) ACs of the second inverter unit 25, may be generated by the second-phase switching unit (composed of two switching elements Q203 and Q206) of the second inverter unit 25. The third-phase AC of the second inverter unit 25, for example, the Z-phase AC from among the three-phase (X-phase, Y-phase, Z-phase) ACs of the second inverter unit 25, may be generated by the third-phase switching unit (composed of two switching elements Q205 and Q202) of the second inverter unit 25.

For example, the first switching unit (Q101, Q104) has a structure in which two switching elements Q101 and Q104 are connected in series, and this connection structure is generally referred to as a pole, a leg, or an arm. The switching elements are alternately turned on/off in a complementary switching manner. DC power may be input to both ends of the first switching unit (Q101, Q104), and the AC voltage may be output from any point between the two switching elements. This AC output voltage is referred to as a pole voltage. Since the two switching elements control one phase, all three switching units (i.e., six switching elements) are required to control the three-phase AC.

As can be seen from FIG. 1(a), the first inverter unit 15 includes six switching elements Q101 to Q106, and the second inverter unit 25 includes six switching elements Q201 to Q206.

Representative examples of the switching elements used in such basic circuit may include a gate turn-off (GTO) thyristor, an insulated gate commutated transistor (IGCT), an insulated gate bipolar transistor (IGBT), a metal oxide semiconductor field effect transistor (MOSFET), etc., each of which is a power semiconductor device. The switching elements may be selected according to the power capacity and switching frequency required for the application field.

For example, the GTO thyristor and the IGBT that can handle the largest capacity are used in inverters of 10 MVA or more, but the possible switching frequency of each of the GTO thyristor and the IGBT is as low as 1 kHz or less. The IGBT can be used as the most popular element in medium-capacity classes of 10 MVA or less and can obtain a switching frequency of up to several tens of kHz. MOSFET is used as a small capacity class in low-voltage inverters of 600 V or less, and can maximally increase the switching frequency to operate in the range of up to hundreds of kHz.

In addition, diodes (D101 to D106, D201 to Q206) may be connected in inverse parallel to the switching elements so that the switching elements can be protected.

Generally, three-phase AC motors have been widely used in electric motors configured to use the alternating current. The three-phase motor or the three-phase induction motor refers to a device that obtains power by generating a rotation magnetic field using three single-phase alternating currents having different phases. In other words, the AC power flows in the motor windings that are arranged at 120° intervals, so that the motor can rotate with each frequency of the received power.

The three-phase inverter circuit configured to control the three-phase motor consists of three poles. The poles may be switched independently of each other, and each pole may be used for the output of one phase voltage.

The present disclosure relates to a method for controlling a three-phase double-winding motor. Therefore, in the same manner as in FIG. 1(a), the three-phase double-winding refers to a motor in which two three-phase coils are controlled by the first inverter unit 15 and the second inverter unit 25, respectively.

That is, the first inverter unit 15 and the second inverter unit 25, each of which switches three phases, may include 6 switching elements. The first inverter unit 15 may include six switching elements Q101 to Q106, and may include six diodes D101 to D106 respectively connected to the six switching elements Q101 to Q106. The second inverter unit 25 may include six switching elements Q201 to Q206, and may include six diodes D201 to D206 respectively connected to the six switching elements Q201 to Q206.

The present disclosure relates to a motor assembly including a three-phase double-winding motor and two inverter units, and a method for controlling the motor assembly. The reason for the use of the three-phase double-winding motor (also called a dual three-phase motor) is to use a double-winding-type three-phase AC through which a system required to be more stably driven can enable each inverter to control one three-phase alternating current using a dual inverter system.

Since the motor can be driven by the other inverter unit even if one inverter unit fails, the motor can also be driven in an emergency such as a failure or the like.

FIG. 1(b) illustrates an example of the AC motor having coils for supplying two three-phase alternating currents. Referring to FIG. 1(b), the AC motor may include a first terminal 311 connected to a first coil 321 in which three-phase windings controlled by the first inverter unit 15 are used as one set, and a second terminal 312 connected to a second coil 322 in which three-phase windings controlled by the second inverter unit 25 are used as one set. The first terminal 311 may be connected to each of a first winding 321a (see FIG. 2(a)) to which the U-phase AC is applied, a second winding 321b (see FIG. 2(a)) to which the V-phase AC is applied, and a third winding 321c (see FIG. 2(a)) to which the W-phase AC is applied. The second terminal 312 may be connected to each of a first winding 322a (see FIG. 2(a)) to which the X-phase AC is applied, a second winding 322b (see FIG. 2(a)) to which the Y-phase AC is applied, and a third winding 322c (see FIG. 2(a)) to which the Z-phase AC is applied. Here, the above terminal-to-winding coupling structure of FIG. 1(b) is achieved through different metal bars, but the scope of the present disclosure is not limited thereto, and such coupling structure can also be implemented in any form such as bur bars as long as they can be coupled to the respective phases.

FIG. 1(c) is a diagram schematically illustrating the arrangement of windings of the first coil 321 and the second coil 322. In the first coil 321, the U-phase AC, the V-phase AC, and the W-phase AC having a phase difference of 120° therebetween may flow in the windings arranged at 120° intervals. In the second coil 322, the X-phase AC, the Y-phase AC, and the Z-phase AC having a phase difference of 120° therebetween may flow in the windings arranged at 120° intervals.

FIG. 2(a) illustrates a portion of the motor 30 in which the first coil 321 and the second coil 322 are wound in a distributed winding manner. Similarly to a general motor, the motor 30 may include a stator 330 having a cylindrical structure, a rotor 350 including a rotary shaft, and an air gap between the stator and the rotor. The stator and the rotor may be made of an iron core of ferromagnetic material so that a large magnetic flux density can be obtained. In order to reduce hysteresis loss and eddy current loss caused by a core loss (i.e., a time-varying magnetic flux), thin silicon-alloy steel sheets may be stacked (or laminated), and a gap between the thin silicon-alloy steel sheets may be insulated and used.

The first coil 321 and the second coil 322, which are three-phase windings formed of an insulated copper (Cu) wire or conductor, may be concentrically disposed at 120° intervals therebetween in several slots 315 formed by the core 316 of the stator 330. However, as can be seen from FIG. 2, copper wires or conductors for each phase can be distributed in several slots. That is, the conductors of each phase may be distributed in sinusoidal numbers in several slots so that the air gap magnetic flux generated when a current flows in the first coil 321 or the second coil 322 has a sinusoidal waveform. This winding arrangement scheme is referred to as a distributed winding scheme in which the utilization rate of the iron core increases compared to the concentrated winding scheme in which all conductors are arranged in one pair of slots, and harmonic waves (harmonics) of the air gap magnetic flux may decrease to reduce torque ripples, so that the distributed winding scheme are more widely used.

Referring to FIG. 2(a), in the distributed winding scheme, the U-phase AC flowing in the winding 321a of the first coil 321, the V-phase AC flowing in the winding 321b of the first coil 321, and the W-phase AC flowing in the winding 321c of the first coil 321 are sequentially arranged. Also, the X-phase AC flowing in the winding 322a of the second coil 322, the Y-phase AC flowing in the winding 322b of the second coil 322, and the Z-phase AC flowing in the winding 322c of the second coil 322 are sequentially arranged between the U-, V-, W-phase windings. FIG. 2(a) shows an example of a stator having a total of 36 slots. In FIG. 2(a), 9 slots corresponding to a quarter of the 36 slots are illustrated. That is, the U-phase winding 321a, the X-phase winding 322a, the V-phase winding 321b, the Y-phase winding 322b, the W-phase winding 321c, and the Z-phase winding 322c are respectively inserted into six slots and alternately arranged.

Figure 2:
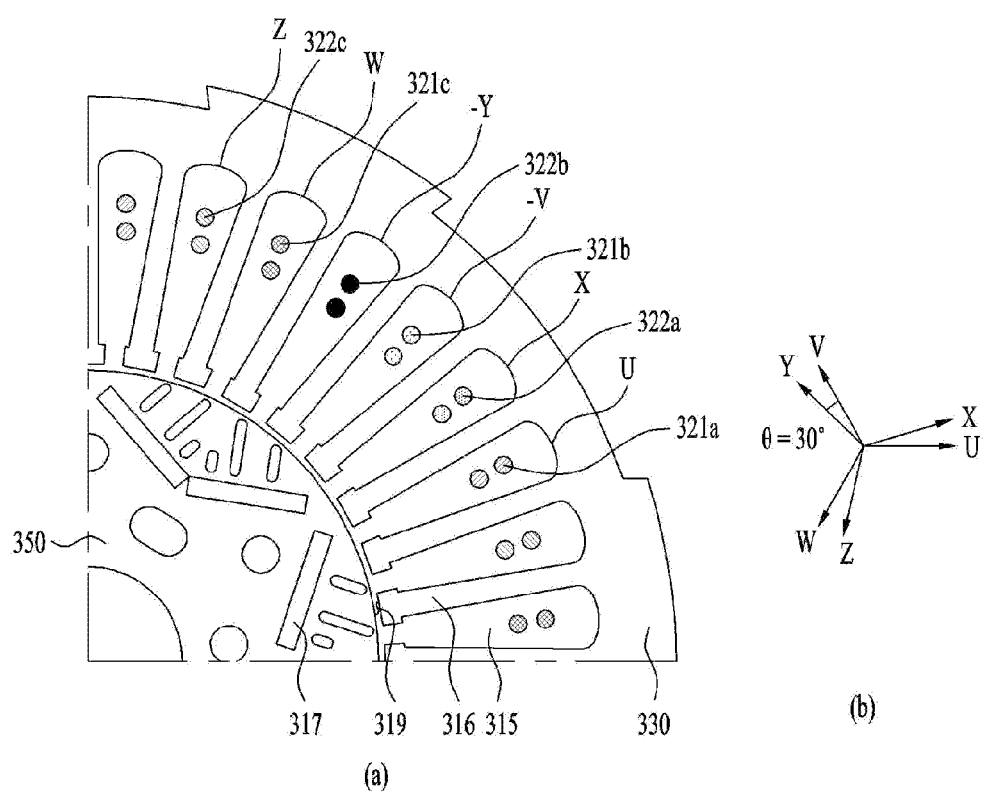
FIG. 2(a) is a schematic diagram illustrating a portion of a motor in which coils are wound in a distributed winding manner.
FIG. 2(b) is a schematic diagram illustrating that a phase difference of three-phase alternating current flowing through each coil is set to 30 degrees (30°).

The first coil 321 and the second coil 322 are physically arranged to have a phase difference of 30° or −30° therebetween. In the following description, the −30° phase difference will be described as having a phase difference of −30° between the first coil 321 and the second coil 322 because there is no conceptual difference in description between the −30° phase difference and the 30° phase difference. Also, unlike the U-phase AC and the W-phase AC, the V-phase AC is marked with '−V' (see FIG. 2), which is only used to indicate the changed direction of current flowing in the windings of the motor depending on the winding method. Likewise, the Y-phase AC is marked with '−Y' as shown in FIG. 2.

The rotor 350 may also have a structure in which a conductor of thinly stacked ferromagnetic iron cores is inserted similarly to the stator 330. The stator 350 may have various types of rotors according to the induction motor or the synchronous motor, and the rotor 350 including a permanent magnet 317 is shown in FIG. 2.

FIG. 2(b) shows that the U-phase AC and the X-phase AC have a phase difference of 30° therebetween, the V-phase AC and the Y-phase AC have a phase difference of 30° therebetween, and the W-phase AC and the Z-phase AC have a phase difference of 30° therebetween. In the three-phase system such as a three-phase motor or a three-phase AC motor, a-phase, b-phase, and c-phase variables generally having a phase difference of 120° therebetween can be denoted by rotation vectors as shown in FIG. 2(b). At this time, since the first coil and the second coil have a phase difference of 30° therebetween, the X, Y, and Z phases having a phase difference of 30° with respect to the U, V, and W phases may be displayed using the rotation vectors. In addition, in order for the above-described structure to coincide with the structure of the motor 30, the first inverter unit 15 and the second inverter unit must supply the alternating current to the motor 30 such that the motor 30 can obtain a desired output. If the windings of the first coil 321 and the second coil 322 are wrongly arranged, the first coil 321 and the second coil 322 do not match the physical phase so that a power factor of the first inverter 14 and a power factor of the second inverter 25 are degraded and it is impossible for the motor to obtain the desired output.

On the other hand, as shown in FIG. 2(a), the largest feature of the motor structure configured to use the three-phase AC is that an air gap between the stator and the rotor is small. If the air gap is small, the power factor can be improved by reducing the excitation current as an advantage. In contrast, if the air gap is small, the magnetic field may be strongly affected by harmonics, so that loss of the motor may increase and performance of the motor may be degraded as a disadvantage.

When harmonics occur in the motor, the motor may not start or accelerate during startup, or abnormal sound may occur during startup. Therefore, there is a need for the motor to be controlled in the direction of predicting and reducing such harmonics. Harmonics refer to a frequency that is an integer multiple of the fundamental wave. Harmonics generated during the motor operation may cause occurrence of mechanical vibration, and may deteriorate the operation efficiency caused by the increased noise and harmonic current, thereby ultimately shortening the lifespan of the motor due to insulation breakdown, deformation, and destruction of the motor.

Figure 3:
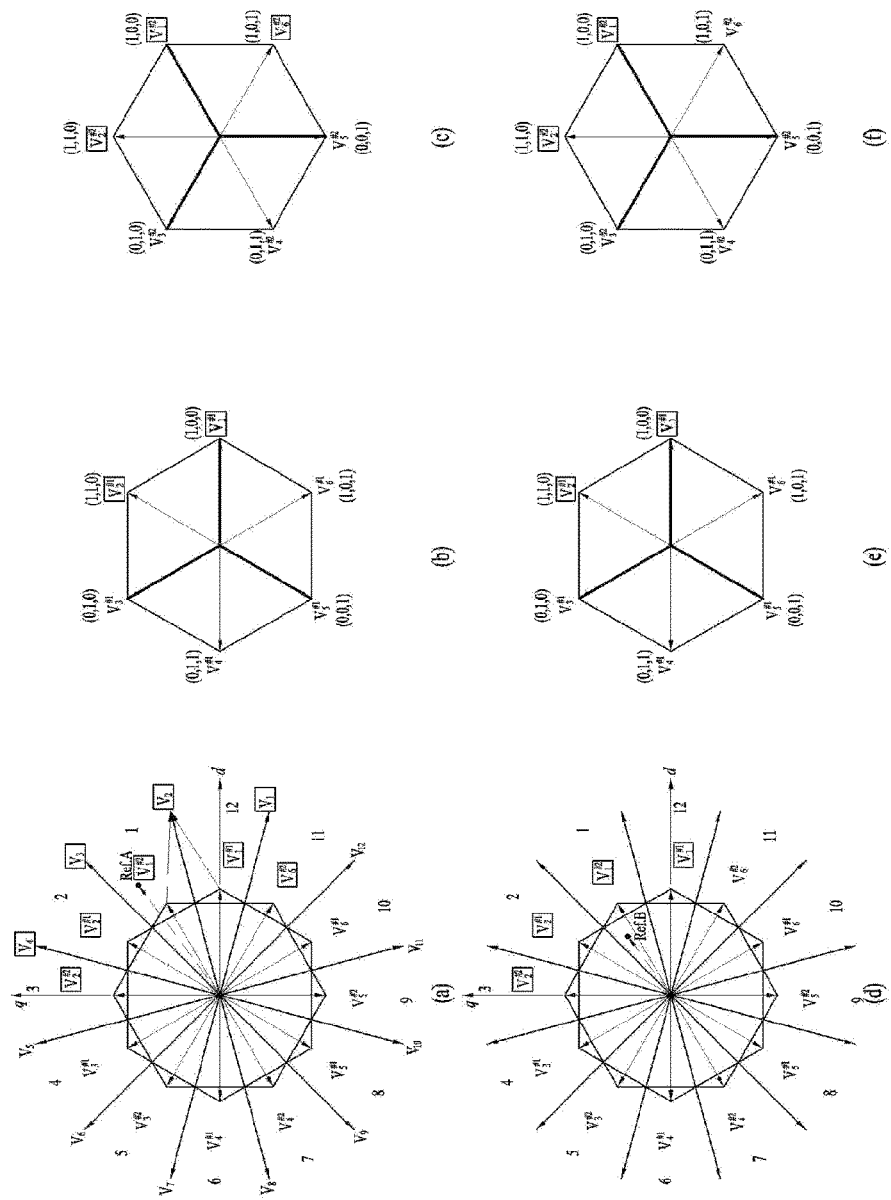
FIGS. 3(a) to 3(c) schematically illustrate methods for decomposing a voltage reference vector using 5 inverter vectors in a conventional manner.
FIGS. 3(d) to 3(f) schematically illustrate methods for decomposing a voltage reference vector using four inverter vectors.

FIGS. 3(a) to 3(c) relate to a method for decomposing a voltage reference vector using five inverter vectors in a conventional manner. FIGS. 3(d) to 3(f) relate to a method for decomposing a voltage reference vector using four inverter vectors.

In order to explain FIGS. 3(a) to 3(f), a space vector pulse width modulation (SVPWM) scheme using the d-q axis coordinate transformation and the vector space decomposition technique will hereinafter be described with reference to FIGS. 3(a) to 3(f). Since the above-described concept is well known to those skilled in the art, a detailed description thereof will be briefly given within the necessary range. In other words, the present disclosure will briefly describe the SVPWM scheme in which one three-phase alternating current (AC) is used, and will then describe another example in which two three-phase alternating currents are used.

In the case of using a three-phase system such as a three-phase motor, reference frame transformation is performed using variables that are converted into variables of orthogonal coordinates (consisting of the d-axis, q-axis, and z-axis) rather than using a-, b-, c-phase variables as shown in FIG. 2(b). The reason why the reference frame transformation is used is to more efficiently use the three-phase system.

The d-axis (direct axis) of the transformed orthogonal coordinates refers to an axis in which the magnetic field flux of the motor occurs. The d-axis is a reference axis for vector control of the AC motor.

The q-axis (quadrature axis) or a horizontal axis of the transformed orthogonal coordinates is an axis perpendicular to the d-axis indicating a reference axis. The q-axis (quadrature axis) of the transformed orthogonal coordinates is an axis perpendicular to the d-axis indicating a reference axis. The q-axis is located ahead of the d-axis when the physical amount (such as a field magnetic flux) of the motor rotates counterclockwise over time. The q-axis becomes the axis of the current or counter electromotive force that generates torque during vector control.

The z-axis (i.e., a neutral axis or an n-axis) or the neutral axis (or an imaging axis) of the transformed orthogonal coordinates is an axis where the d-axis and the q-axis are orthogonal to each other in a three-dimensional (3D) space. These axes represent loss components. In this case, terms contributing to generation of mechanical output in the motor may be d-axis and q-axis components.

Typically, the magnitude of the output voltage of a three-phase square wave inverter (also called a six step inverter) is maximally fixed, and only the frequency of the three-phase square wave inverter is controllable. In the inverter capable of driving the AC motor, there is a need for this inverter to modulate the frequency of the output voltage as well as the magnitude of the output voltage. To this end, a pulse width modulation (PWM) scheme can be used.

Such PWM schemes may include an optimal/programmed PWM scheme, a carrier-based PWM scheme, and a space vector PWM (SVPWM) scheme.

Unlike other PWM schemes, the SVPWM scheme may express three-phase voltage references as a single space vector in a complex space on the d-q plane consisting of the d-axis and the q-axis so that the three-phase voltage references expressed as the single space vector are modulated. When the voltage modulated by this SVPWM scheme is applied to the motor through the inverters, the amount of harmonics included in the current and torque is smaller than those of other schemes, so that the SVPWM scheme is currently the most popular technique in associated technical fields.

In the SVPWM scheme, since a voltage reference related to the phase voltage is given as a space vector, the output voltages of the inverters of the inverter units 15 and 25 capable of generating the voltage reference can be expressed as a space voltage vector. This is because the phase voltage depends not only on the switching state of the corresponding pole, but also on the switching state of the other two poles. Thus, the phase voltage refers to a voltage determined by states of all switches of the inverters. As a result, in a situation where the switching functions of three phases (e.g., a-phase, b-phase, and c-phase) are denoted by $S_a$, $S_b$, and $S_c$, if the above-described switches are turned on, the switching function of the corresponding switch may be denoted by '1', and when the above-described switches are turned off, the switching function of the corresponding switch may be denoted by '0'. In the switching function, eight different switching states that can be output by three switching elements of each inverter unit are expressed using six active voltage vectors and two zero voltage vectors. Since the switching element of each phase has '0' or '1', there may be a total of eight switching states in the case of three phases. The above-described concept can be expressed as shown in FIG. 5(a) in a complex space of the d-q plane. Here, the superscript #1 denotes the first inverter unit 15, and the subscripts denote six active voltage vectors. In this case, two zero voltage vectors are indicated at the origin. A plane divided by the active voltage vectors may be referred to as sectors. As can be seen from FIG. 3, the plane may be divided into six sectors.

If the three-phase voltage references change with time, the voltage reference vector (V*) rotates counterclockwise in the complex space as described above. In this case, the voltage reference vector can make the same voltage on average as the voltage reference vector during a preset voltage modulation period ($T_s$) using two adjacent active voltage vectors $V_n$ and $V_{n+1}$ (where, n=1 to 5) and the zero voltage vectors ($V_0$, $V_7$). The process of synthesizing voltages in three phases may be repeated at intervals of a voltage modulation period ($T_s$) determined by the switching frequency. The voltage modulation period may refer to a time cycle for modulating the space voltage vector within one switching cycle to indicate the voltage reference vector. There are the on-sequence voltage modulation period for turning on each switching element and the off-sequence voltage modulation period for turning off each switching element. If the switching function is formed in a horizontal symmetrical shape within one switching cycle, the on-sequence voltage modulation period and the off-sequence voltage modulation period become equal to each other, so that each of the two voltage modulation periods (i.e., the on-sequence voltage modulation period and off-sequence voltage modulation period) will hereinafter be referred to as a voltage modulation period ($T_s$) for convenience of description.

Referring to FIG. 5(b), $V_1$, which is one vector among adjacent active voltage vectors of the voltage reference vector (V*), is first applied during the time period ($T_a$). Then, a voltage having the magnitude of $V_1 \cdot (T_a/T_s)$ is generated in the direction of the vector ($V_1$). Subsequently, the remaining adjacent vector ($V_2$) is applied to the motor during the time ($T_b$) so that the resultant vector can be matched to the voltage reference vector (V*) in terms of the phase and magnitude. In addition, the zero voltage vector is applied to the motor during the time '$T_0=T_s-(T_1+T_2)$' so that no more voltage is generated in the motor.

On the other hand, although the active voltage vectors and the zero voltage vectors are applied to the motor in any order within the voltage modulation period ($T_s$), the average output voltage having the same magnitude can be obtained. However, various voltage modulation performances, such as harmonic characteristics, switching frequency, and voltage utilization rate, may vary depending on the order of the active voltage vectors and the zero voltage vectors. In particular, the ripple magnitude and the ripple frequency of load current may vary depending on the application position of the active voltage vector. Therefore, it is the most preferable that the active voltage vector be located at the center point within the voltage modulation period ($T_s$). In this case, the switching frequency can be reduced. This scheme is called symmetrical SVPWM.

At this time, the sum of the on-sequence voltage modulation period for turning on the switches of the inverters and the off-sequence voltage modulation period for turning off the switches of the inverters may be referred to as a switching cycle. However, when the active voltage vector is located at the center point within the voltage modulation period ($T_s$), a left-right symmetrical pattern can be formed, so that one switching cycle ($T_{sw}$) is twice the two voltage modulation periods ($T_s$), as represented by $T_{sw}=2\cdot T_s$. At this time, the switching frequency can be minimized, and the influence of harmonics can also be minimized. In addition, the voltage modulation period is used in the same manner as in the current control period.

In brief, a voltage reference vector for a constant voltage modulation period ($T_s$) can be generated using six active voltage vectors and two zero vectors that can be output from one inverter, so that the on/off times of the respective switching elements can be determined. That is, the switching function can be determined.

Through calculation on three phases, the dwell times of the active voltage vectors and the zero voltage vectors can be calculated using Equation 4.

$$\begin{bmatrix} T_1 \\ T_2 \\ T_3 \\ T_4 \\ T_5 \end{bmatrix} = \begin{bmatrix} V_d^1 & V_d^2 & V_d^3 & V_d^4 & V_d^5 \\ V_q^1 & V_q^2 & V_q^3 & V_q^4 & V_q^5 \\ V_{z_1}^1 & V_{z_1}^2 & V_{z_1}^3 & V_{z_1}^4 & V_{z_1}^5 \\ V_{z_2}^1 & V_{z_2}^2 & V_{z_2}^3 & V_{z_2}^4 & V_{z_2}^5 \\ 1 & 1 & 1 & 1 & 1 \end{bmatrix}^{-1} \begin{bmatrix} V_d^* T_s \\ V_q^* T_s \\ 0 \\ 0 \\ T_s \end{bmatrix}$$ [Equation 4]

In Equation 4, '$\theta$' denotes the angle between the voltage reference vector and the active voltage vector in the counterclockwise direction in the d-axis (see FIG. 5(b)), $V_{dc}$ denotes the DC voltage applied to the inverter, and |V*| denotes the magnitude of the voltage reference vector.

In addition, according to the switching functions $S_a$, $S_b$, and $S_c$ determined as described above, the ON sequence and the OFF sequence may appear as a symmetrical pattern within the switching cycle ($T_{sw}$). That is, a pattern of the switching function for each phase according to the ON sequence and the OFF sequence corresponding to one switching cycle may be referred to as a switching pattern, resulting in formation of a symmetrical pattern in three-phase alternating current as described above.

That is, the switching pattern means that, according to the applied voltage reference vector, three switching states of each inverter unit are shown in one switching cycle according to the dwell time. Alternatively, the switching pattern means that, according to the applied voltage reference vector, the corresponding space voltage vectors (i.e., two active voltage vectors and zero voltage vectors which are adjacent to the voltage reference vector) is expressed according to the dwell time within one voltage reference vector.

In the three-phase AC, the switching patterns may always be formed in a symmetrical shape. This is because the order of turning on two active voltage vectors and the zero voltage vectors in one of the two voltage modulation periods within one switching cycle is opposite to the order of tuning off two active voltage vectors and the zero voltage vectors in the other one of the two voltage modulation periods within one switching cycle. This means that the control signals for turning on/off three phases by the inverters during the switching cycle are horizontally symmetrical to each other.

Specifically, signals for turning on/off the first-phase switching unit, the second-phase switching unit, and the three-phase switching unit may be formed symmetrical in a horizontal direction within the switching cycle. This also means that the voltages applied to the phase windings of the first coil and the second coil according to the on/off states of the first-phase switching unit, the second-phase switching unit, and the third-phase switching units are horizontally symmetrical to each other during the switching cycle.

For example, as can be seen from upper three patterns from among the switching patterns of FIG. 5(c), patterns of three switching functions ($Sa^{\#1}$, $Sa^{\#2}$, $Sa^{\#3}$) are horizontally symmetrical to each other with respect to the center point (half point) of the time period $T_{sw}$. Also, the above-described pattern symmetry can be recognized by checking the output of the inverter terminals using a waveform analyzer (e.g., an oscilloscope, a spectrum analyzer, and the like). Of course, the above-described pattern symmetry may be affected by a sampling time and noise of the waveform analyzer, but it can be seen that the symmetrical patterns are mathematically symmetrical in the horizontal direction.

So far, the SVPWM scheme using three-phase AC has been described above. If the SVPWM scheme is applied to a six-phase motor or the three-phase double-winding motor, it is possible to use only one inverter capable of simultaneously controlling six phases, but two conventional three-phase inverters instead of one inverter are generally used for more stable control. In this case, six sectors are formed by inverters of the two inverter units 15 and 25, and the six sectors are arranged to have a phase difference of 30° therebetween.

FIG. 3(b) illustrates the inverter output voltage vectors caused by the first inverter unit 15, and FIG. 3(c) illustrates that the inverter output voltage vectors having a phase difference of 30° therebetween by the second inverter unit 25 are depicted in the complex space of the d-q plane. The sum of FIG. 3(b) and FIG. 3(c) is shown in FIG. 3(a). Therefore, FIG. 3(b) shows first active voltage vectors ($V_1^{\#1}$ to $V_6^{\#1}$) of the first inverter unit 15, and FIG. 3(c) shows second active voltage vectors ($V_1^{\#2}$ to $V_6^{\#2}$) of the second inverter unit 25. In FIG. 3(c), the second active voltage vectors ($V_1^{\#2}$ to $V_6^{\#2}$) of the second inverter unit 15 are rotated by 30 degrees (30°) in consideration of the phase difference.

FIG. 3(a) shows two hexagons indicating the sum of FIG. 3(b) and FIG. 3(c). In more detail, the two hexagons are depicted in one plane as shown in FIG. 3(a). In FIG. 3(a), the adjacent vectors of the first active voltage vectors ($V_1^{\#1}$ to $V_6^{\#1}$) and the second ($V_1^{\#2}$ to $V_6^{\#2}$) are summed to represent 12 synthetic vectors ($V_1$ to $V_{12}$).

In more detail, among the first active voltage vectors ($V_1^{\#1}$ to $V_6^{\#1}$) and the second active voltage vectors ($V_1^{\#2}$ to $V_6^{\#2}$) formed by 30° rotation of the first active voltage vectors ($V_1^{\#1}$ to $V_6^{\#1}$), some active voltage vectors adjacent to each other can be combined and synthesized. For example, the first active voltage vector ($V_1^{\#2}$) of the second inverter unit 25 is disposed between the first active voltage vector ($V_1^{\#1}$) and the second active voltage vector ($V_2^{\#1}$) of the first inverter unit 15, so that the adjacent vectors of the second active voltage vector ($V_1^{\#2}$) are denoted by $V_1^{\#1}$ and $V_2^{\#1}$, respectively. Thereafter, the first active voltage vector ($V_1^{\#2}$) is combined with each of the active voltage vectors ($V_1^{\#1}$, $V_2^{\#1}$), resulting in formation of vectors $V_2$ and $V_3$. Similarly, if the remaining vectors other than the above-described vectors are combined with each other, a total of 12 synthetic vectors ($V_1$ to $V_{12}$) can be obtained. In this way, each of the regions capable of being separated from each other in the d-q plane by such 12 synthetic vectors may be referred to as a sector, resulting in formation of a total of 12 sectors.

In a situation where the obtained synthesized vectors are denoted by $V_1$ to $V_{12}$ and one region between the synthetic vectors $V_2$ and $V_3$ is first set to a first sector #1, 12 sectors are arranged in a counterclockwise direction with respect to the first sector #1. In this case, the z1-z2 plane may be represented as denoted by the z1-z2 plane of the conventional method of Table 1 below.

On the other hand, the conventional technique is modeled through the six-phase windings so that two independent planes from which vector interference components are removed are formed. Three sub-spaces or planes are decomposed into the d-q plane, the z1-z2 plane, and the o1-o2 plane. Here, the o1-o2 plane is always mapped to the origin because the first coil 321 and the second coil 322 are wound in a neutral manner, so that only the d-q plane and the z1-z2 plane need to be considered. That is, a plane where energy conversion is actually performed is referred to as the d-q plane, and a sub-space indicating either harmonics or an energy loss is referred to as the z1-z2 plane. The d-q plane may be represented by 12 synthetic vectors as described above, and a total of two planes (z1, z2) may be used for each of three phases, resulting in formation of the z-plane. The above-described technology is referred to as vector space decomposition.

Here, the prior art requires four synthetic vectors to calculate four independent values from the coordinate axes on each plane. In addition, a time (i.e., a turn-on time) for which the corresponding four synthetic vectors are applied to the motor must be calculated through the inverse matrix based on the result of calculation of the magnitude of each coordinate axis.

In this case, since four synthetic vectors use a total of five active voltage vectors, two active voltage vectors are used in one inverter, but three active voltage vectors must be used in the other inverter, so that it is impossible to form a symmetrical pattern. In addition, since it is necessary for the inverse matrix to be calculated through the selected synthetic vector, the amount of calculation unavoidably increases. As a result, a longer calculation time as much as the increased calculation amount must be guaranteed, so that the switching cycle also unavoidably increases.

For example, in order to display the voltage represented by a voltage reference vector A(Ref.A), a total of four synthetic vectors ($V_1$, $V_2$, $V_3$, $V_4$) is required (see $V_1$, $V_2$, $V_3$, and $V_4$ depicted in rectangles of FIG. 3a) because four variables are required for each of the d-q plane and the z1-z2 plane (see a first row of Table 1). The d-q plane relates to electromechanical energy and the z1-z2 plane relates to energy loss, so that an average voltage value for every sampling time needs to be zero. In order to re-display each synthetic vector using the active voltage vector, five active voltage vectors denoted by $V_6^{\#2}$, $V_1^{\#1}$, $V_1^{\#2}$, $V_2^{\#1}$, $V_2^{\#2}$) are required (see $V_6^{\#2}$, $V_1^{\#1}$, $V_1^{\#2}$, $V_2^{\#1}$, $V_2^{\#2}$ depicted in rectangles of FIG. 3a). In one inverter unit, rectangular vectors ($V_1^{\#1}$, $V_2^{\#1}$) are used as shown in FIG. 3(b), and in the other inverter unit, three rectangular vectors ($V_6^{\#2}$, $V_1^{\#2}$, $V_2^{\#2}$) are used as shown in FIG. 3(c), so that the symmetrical switching patterns cannot be formed.

Figure 4:
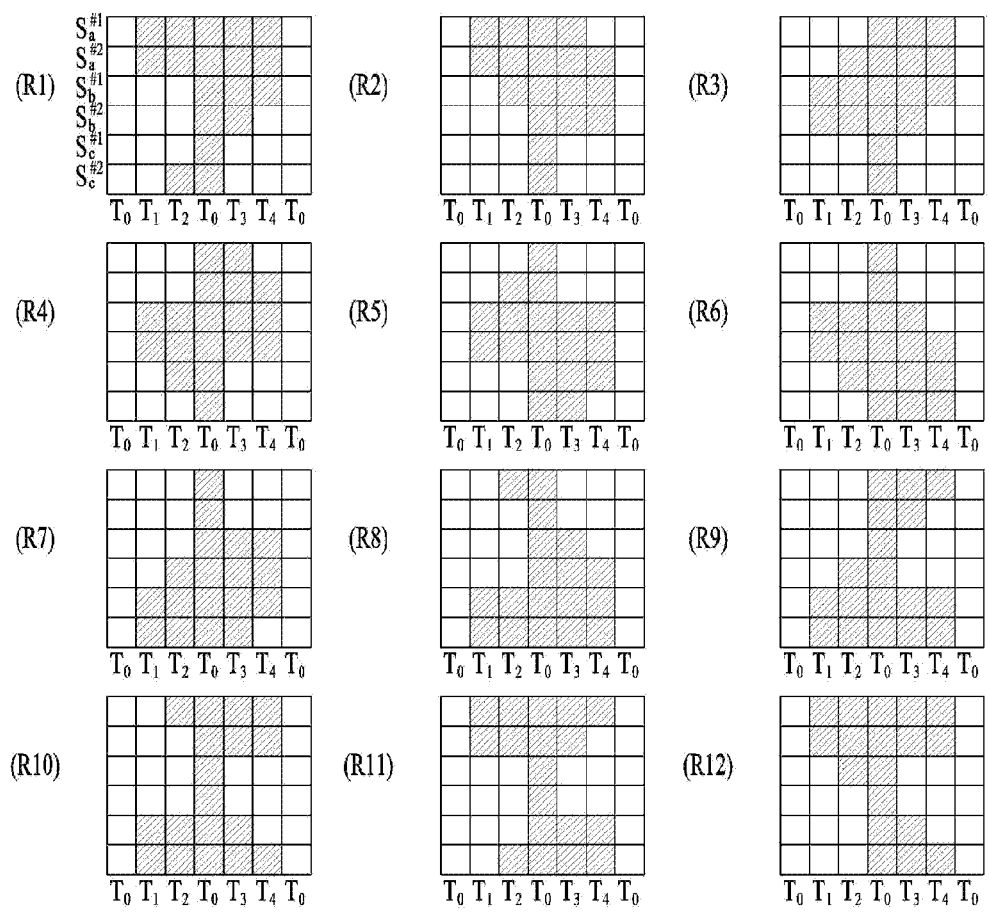
FIG. 4 schematically illustrates asymmetrical switching patterns according to the related art.

FIG. 4 shows switching patterns according to the prior art in which four synthetic vectors adjacent to a sector to which the voltage reference vector belongs are used. A time period for which the voltage is applied to four adjacent synthetic vectors may be calculated using four synthetic vectors in each of the d-q plane and the z1-z2 plane in the same manner as in the prior art shown in Table 1, so that an inverse matrix composed of 5 rows and 5 columns shown in Equation 5 needs to be calculated.

$$\begin{bmatrix} T_1 \\ T_2 \\ T_3 \\ T_4 \\ T_5 \end{bmatrix} = \begin{bmatrix} V_d^1 & V_d^2 & V_d^3 & V_d^4 & V_d^5 \\ V_q^1 & V_q^2 & V_q^3 & V_q^4 & V_q^5 \\ V_{z_1}^1 & V_{z_1}^2 & V_{z_1}^3 & V_{z_1}^4 & V_{z_1}^5 \\ V_{z_2}^1 & V_{z_2}^2 & V_{z_2}^3 & V_{z_2}^4 & V_{z_2}^5 \\ 1 & 1 & 1 & 1 & 1 \end{bmatrix}^{-1} \begin{bmatrix} V_d^* T_s \\ V_q^* T_s \\ 0 \\ 0 \\ T_s \end{bmatrix} \quad \text{[Equation 5]}$$

In Equation 5, $V_d^k$ denotes the magnitude on the d-axis of the k-th active voltage vector, and $V_q^k$ denotes the magnitude on the q-axis of the k-th active voltage vector. $V_{z1}^k$ denotes the magnitude on the z1-axis of the k-th active voltage vector, and $V_{z2}^k$ denotes the magnitude on the z2-axis of the k-th active voltage vector. In addition, $V_d^*$ denotes the d-axis magnitude of the voltage reference vector, and $V_q^*$ denotes the q-axis magnitude of the voltage reference vector. Also, $T_s$ denotes a voltage modulation period, and $T_k$ denotes a dwell time of the corresponding vector. However, $T_5$ is a dwell time of the synthetic vector selected at the zero voltage vector of the d-q plane.

The dwell times $T_1$ to $T_4$ of valid synthetic vectors are calculated so that examples of the switching patterns R1 to R12 for the 12 sectors can be represented as shown in FIG. 4. Referring to the sector R1 in which the voltage reference vector exists in the first sector (sector 1), three-phase switching functions of the first inverter unit are denoted by $S_a^{\#1}$, $S_b^{\#1}$, and $S_c^{\#1}$, respectively. In this case, the pattern of the switching function for each switching period is not formed symmetrically with respect to the center point $T_0$. Similarly, it can be seen that asymmetric patterns are formed in all sectors. In this case, although the respective times are arranged at the same time intervals, the scope of the present disclosure is not limited thereto, and the respective times may also be changed depending on the dwell times as needed.

In order to observe the pattern of the switch function of each phase, signals from the output terminals of each inverter can be recognized through a waveform analyzer (e.g., an oscilloscope or a spectrum analyzer).

In contrast, according to the control method of the present disclosure, the switching patterns are formed symmetrically using two adjacent active voltage vectors for each inverter unit 15 or 25, instead of using four synthetic vectors, in the same manner as in the SVPWM scheme of the above-described three-phase inverter.

FIGS. 3(d) to 3(f) show that the switching patterns are formed symmetrically using a total of four inverter active voltage (or synthetic) vectors (composed of two adjacent active voltage vectors of the first inverter unit 15 and two adjacent active voltage vectors of the second inverter unit 25) in order to display the voltage represented by a voltage reference vector (Ref. B).

Figure 6:
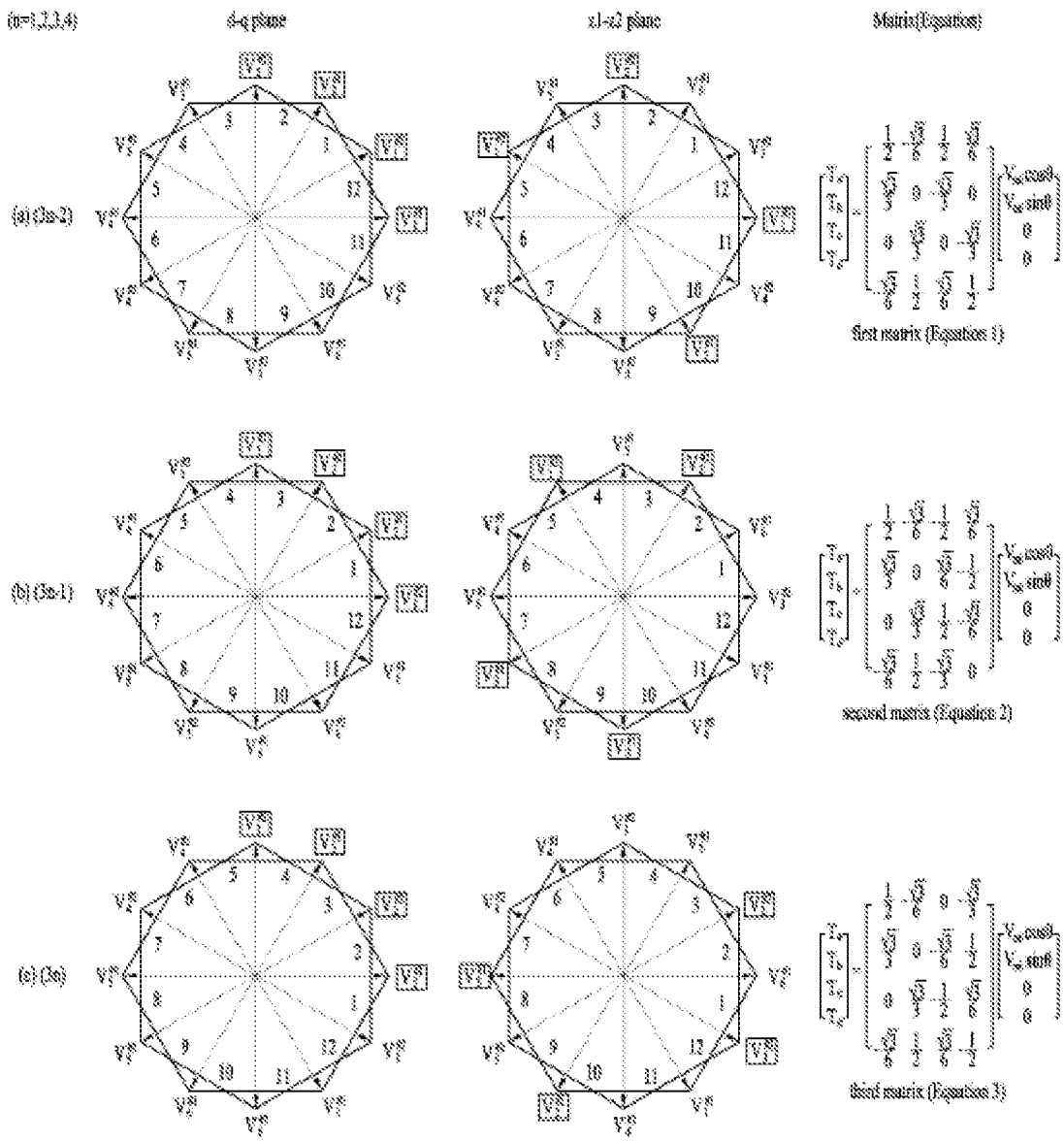
FIGS. 6(a) to 6(c) illustrate matrix equations for calculating a dwell time of a voltage vector in each case after classifying all 12 sectors into three cases.

Referring to FIG. 6(a), the first active voltage vectors ($V_1^{\#1}$ to $V_6^{\#1}$) and the second active voltage vectors ($V_1^{\#2}$ to $V_6^{\#2}$) of the second inverter unit 25 are arranged in a counterclockwise direction. The active voltage vectors in the z1-z2 plane indicating harmonics may be displayed as shown in FIG. 6(a). Unlike the d-q plane, the vectors $V_1^{\#1}$ and $V_1^{\#2}$ are not adjacent to each other. This is because the d-q plane indicates fundamental waves and harmonic components of 12m±1 (where, m=1, 2, 3 . . . ) and the z1-z2 plane indicates harmonic components of 6m±1 (where, m=1, 3, 5 . . . ).

FIG. 3(e) shows the inverter output voltage vectors generated by the first inverter unit 15, and FIG. 3(f) shows that the inverter output voltage vectors having a phase difference of 30° therebetween by the second inverter unit 25 are depicted in the complex space of the d-q plane. The sum of FIG. 3(e) and FIG. 3(f) is shown in FIG. 3(d). Therefore, the first active voltage vectors ($V_1^{\#1}$ to $V_6^{\#1}$) of the first inverter unit 15 are shown in FIG. 3(e), and the second active voltage vectors ($V_1^{\#2}$ to $V_6^{\#2}$) of the second inverter unit 25 are shown in FIG. 3(f). In addition, the second active voltage vectors ($V_1^{\#2}$ to $V_6^{\#2}$) of the second inverter unit 15 may be rotated by 30° in the counterclockwise direction in consideration of the phase difference.

Specifically, the first active voltage vectors ($V_1^{\#1}$ to $V_6^{\#1}$) and the second active voltage vectors ($V_1^{\#2}$ to $V_6^{\#2}$) formed when the first active voltage vectors ($V_1^{\#1}$ to $V_6^{\#1}$) are rotated by 30° in the counterclockwise direction can be summed as shown in FIG. 3(d), so that the first active voltage vectors ($V_1^{\#1}$ to $V_6^{\#1}$) and the second active voltage vectors ($V_1^{\#2}$ to $V_6^{\#2}$) can be distinguished from each other by a total of 12 sectors. In FIG. 3(a), regions between the respective synthetic vectors are distinguished from each other using sectors. In FIG. 3(d), regions between the respective synthetic vectors such that the active voltage vectors of the respective inverters are to be alternately arranged therein may be distinguished from each other by sectors. That is, the spaces between the active voltage vectors of the inverters are denoted by the sectors so that the active voltage vectors can be distinguished from each other using the sectors. Namely, the space or region between the vectors $V_1^{\#1}$ and $V_1^{\#2}$ may be denoted by the twelfth sector, and the space or region between the vectors $V_1^{\#2}$ and $V_2^{\#1}$ may be denoted by the first sector. In this case, each active voltage vector can be represented as in the first case of Table 1 within the z1-z2 plane.

FIG. 3(d) shows the sum of two hexagons depicted in one plane. Unlike FIG. 3(a), instead of using the synthetic vectors indicating the sum of the active voltage vectors of the respective inverters, the active voltage vectors of the respective inverters are used without change. Therefore, the switching patterns can be formed symmetrically using two active voltage vectors selected by each inverter, in the same manner as in the three-phase SVPWM scheme.

FIGS. 5(a) and 5(b) illustrate a method for calculating a dwell time using the SVPWM scheme in three-phase alternating current (AC). The method shown in FIGS. 5(a) and 5(b) is conceptually identical to a method for calculating the dwell time using only one of two inverter units 15 and 25 of the three-phase double-winding motor. This is because two active voltage vectors selected by each inverter are used. Therefore, the method of FIGS. 5(a) and 5(b) is identical to the above-described three-phase AC method.

FIG. 5(c) shows an example of patterns that may occur in one switching cycle ($T_{sw}$). Referring to the patterns of FIG. 5(c), the three-phase switching functions of the first inverter unit 15 are denoted by $S_a^{\#1}$, $S_b^{\#1}$, and $S_c^{\#1}$, respectively, and the three-phase switching functions of the second inverter unit 25 are denoted by $S_a^{\#2}$, $S_b^{\#2}$, and $S_c^{\#2}$, respectively. It can be seen that the above patterns are formed symmetrical to each other based on a specific time $T_0^{\#1}$ or $T_0^{\#2}$ for which the zero voltage vector is applied.

In addition, as described above, one switching cycle ($T_{sw}$) is twice the voltage modulation period ($T_s$), and the switching function for applying each voltage vector during one switching cycle ($T_{sw}$) may be formed symmetrically with respect to a specific time point $T_{sw}/2$ after lapse of the time period ($T_s$).

Also, the active voltage vectors are located at the center point during one switching cycle ($T_{sw}$), so that the switching patterns are formed symmetrically in a horizontal direction.

If the dwell times of two voltage reference vectors and two zero voltage vectors adjacent to the voltage reference vector received from the first inverter unit 15 are denoted by a first dwell time $T_a$, a second dwell time $T_b$, and a third dwell time $T_o^{\#1}$, and if the dwell times of two active voltage vectors and two zero voltage vectors adjacent to the voltage reference vector received from the second inverter unit 25 are denoted by a fourth dwell time $T_c$, a fifth dwell time $T_d$, and a sixth dwell time $T_o^{\#2}$, the voltage modulation period for turning on three switching elements of one inverter unit and the other voltage modulation period for turning off three switching elements of the other inverter unit may be repeated during the switching cycle ($T_{sw}$), so that the symmetrical patterns can be formed as shown in FIG. 5(c). That is, since each inverter is independently controlled using two active voltage vectors, the patterns required for such vector control may always be formed symmetrical with respect to the center point $T_{sw}/2$ as if the three-phase ACs had a symmetrical pattern.

Here, the third dwell time ($T_o^{\#1}$) may represent the remaining time obtained by subtracting the first dwell time ($T_a$) and the second dwell time ($T_b$) from one switching cycle ($T_{sw}$) for convenience of description. The third dwell time ($T_o^{\#1}$) may be located at both ends and at the center part within one switching cycle ($T_{sw}$) of the first inverter unit 15, and may be arbitrarily divided within the switching cycle ($T_{sw}$) according to the voltage reference vector. That is, each of a time period corresponding to the center part of the switching cycle ($T_{sw}$) and a time period corresponding to both ends of the switching cycle ($T_{sw}$) need not be divided in half. Nevertheless, since the voltage modulation period is half of one switching cycle, the sum of a third dwell time, a double first dwell time, and a double second dwell time may be equal to the switching cycle or may be equal to twice the voltage modulation period.

The sixth dwell time ($T_o^{\#2}$) may represent the remaining time obtained by subtracting the fourth dwell time ($T_c$) and the fifth dwell time ($T_d$) from one switching cycle ($T_{sw}$) for convenience of description. The sixth dwell time ($T_o^{\#2}$) may be located at both ends and at the center part within one switching cycle ($T_{sw}$) of the second inverter unit 25, and may be arbitrarily divided within the switching cycle ($T_{sw}$) according to the voltage reference vector. That is, each of a time period corresponding to the center part of the switching cycle ($T_{sw}$) and a time period corresponding to both ends of the switching cycle ($T_{sw}$) need not be divided in half.

Nevertheless, since the voltage modulation period is half of one switching cycle, the sum of a sixth dwell time, a double fourth dwell time, and a double fifth dwell time may be equal to the switching cycle or may be equal to twice the voltage modulation period.

Figure 5:
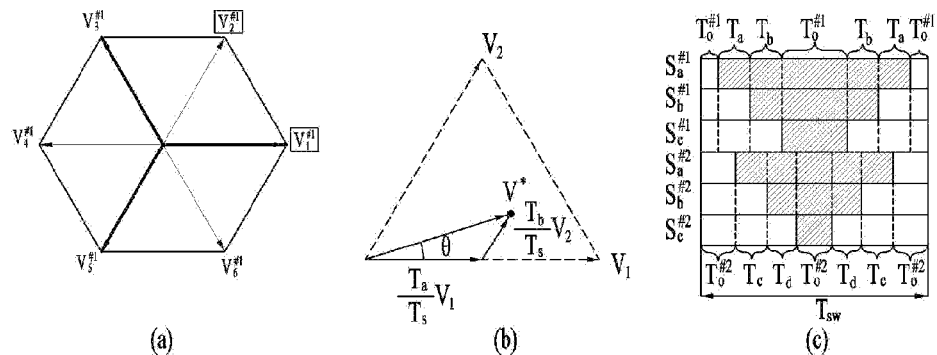
FIGS. 5(a) and 5(b) illustrates a method for calculating a voltage reference vector using an inverter vector by one inverter from among two inverters.
FIG. 5(c) illustrates an example in which the switching patterns are symmetrically calculated.
FIG. 5(d) illustrates an example in which all switching patterns are formed symmetrically in 12 sectors.
Figure 5:
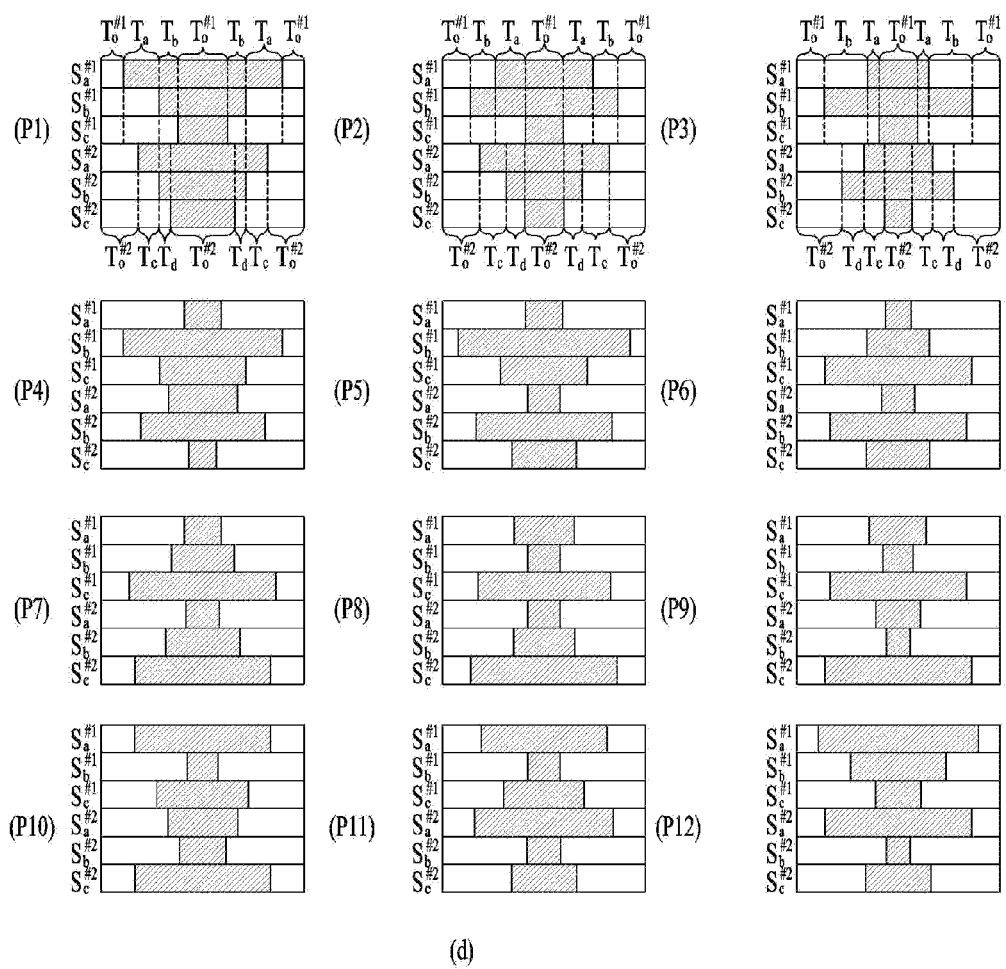

In FIG. 5, a hatched portion refers to a value of '1' indicating that the switching element of each phase is turned on, and a non-hatched portion refers to a value of '0' indicating that the switching element of each phase is turned off. Therefore, the space voltage vectors of the first inverter unit 15 can be checked as shown in FIG. 5(c). In more detail, the space voltage vectors may pass through a voltage modulation period in which switches are sequentially turned on in the order of (0, 0, 0) during the time period ($T_o^{\#1}$)→(1, 0, 0) during the time period ($T_a$)→(1, 1, 0) during the time period ($T_b$)→(1, 1, 1) during one half of the center time period ($T_o^{\#1}$), and may pass through the other voltage modulation period in which switches are sequentially turned off in the order of (1, 1, 1) during the other half of the center time period ($T_o^{\#1}$)→(1, 1, 0) during the time period ($T_b$)→(1, 0, 0) during the time period ($T_a$)→(0, 0, 0) during the other half of the center time period ($T_o^{\#1}$). In other words, when the voltage vectors are applied to the motor according to the above order, switching patterns that are horizontally formed symmetrical to each other can be obtained during one switching cycle.

Accordingly, if the switching patterns are symmetrical to each other in the horizontal direction, this means that the orders of voltage vectors applied to the motor during the switching cycle ($T_{sw}$) appear symmetrically, or means that the switching functions of the switching elements are horizontally symmetrical to each other during the switching cycle ($T_{sw}$). Alternatively, it can be seen that each single-phase AC applied to the first coil 321 by the first inverter unit 15 and each single-phase AC applied to the second coil 322 by the second inverter unit 25 according to the switching function may be horizontally symmetrical to each other during the switching cycle ($T_{sw}$).

The switching elements of the respective phases may be turned on or off during the switching cycle ($T_{sw}$) according to the dwell times of the space voltage vectors, the ON/OFF operations of the switching elements may be referred to as switching functions, and these switching functions are denoted by $S_a^{\#2}$, $S_b^{\#2}$, and $S_c^{\#2}$. As can be seen from FIG. 5(c), it can be seen that each of the switching functions is formed symmetrical in a horizontal direction.

Here, since two time periods ($T_s$) are included in one switching cycle ($T_{sw}$), $T_o^{\#1}$ or $T_o^{\#2}$ appears twice, so that the magnitude of the time period $T_o^{\#1}$ can satisfy '$T_o^{\#1}=T_{sw}-2(T_a+T_b)$' or the magnitude of the time period $T_o^{\#2}$ can satisfy '$T_o^{\#2}=T_{sw}-2(T_c+T_d)$'. In this case, in order to emphasize the appearance of symmetrical patterns, the time period ($T_o^{\#1}$ or $T_o^{\#2}$) at which the zero voltage is applied is indicated to appear at the front, center, and rear portions of the switching function (switching cycle) for convenience of description, but does not represent the overall magnitude of the switching cycle. The front and rear portions in one switching cycle are symmetrical and thus equal to each other, the ratio of the center portion and the front portion of one switching cycle may vary depending on the result of calculation.

FIG. 5(d) shows various patterns that can appear in 12 sectors. That is, FIG. 5(d) shows patterns of each switching function for each switching cycle within the first to twelfth sectors P1 to P12. ($T_a$, $T_b$) or ($T_c$, $T_d$) may be changed depending on the magnitude of the dwell time, but the patterns are all symmetrical with respect to the center point $T_o^{\#1}$ or $T_o^{\#2}$. In addition, the patterns are also symmetrical with respect to the center point $T_{sw}/2$. In each sector, ($T_a$, $T_b$) or ($T_c$, $T_d$) can be inferred based on the contents displayed in the first to third sectors P1 to P3, and as such redundant description thereof will herein be omitted for convenience of description.

In the case of using the space vectors or the symmetrical patterns of the switching functions as described above, a method for calculating the dwell time ($T_a$, $T_b$) or ($T_c$, $T_d$) required for each of the inverter units 15 and 25 that decomposes the voltage reference vector to indicate two adjacent active voltage vectors has the following advantages. That is, in the case of using the synthetic vectors according to the prior art, an asymmetric pattern occurs so that the prior art has disadvantages in that the inverse matrix composed of 5 rows and 5 columns must always be calculated whenever the asymmetric pattern occurs. In contrast, if the active voltage vectors of each of the inverter units 15 and 25 are rotated and used according to the present disclosure, the resultant vectors can be classified into a total of three cases according to vector distribution shapes in the z1-z2 plane. As a result, in a situation where the inverse matrices for the three cases are previously calculated and the calculated inverse matrices are previously stored, if the inverse matrices are properly used according to the three cases, the amount of calculation required for each of the inverter units 15 and 25 can be greatly reduced. In other words, the embodiment of the present disclosure can perform calculation in advance using a predetermined table for three patterns, instead of using the inverse matrix to be calculated for each operation, so that the amount of calculation can be greatly reduced.

In addition, unlike the prior art, the present disclosure does not have to give up control of the z1-ze plane required for symmetric patterns. Three cases may be used according to how they are represented in the z1-z2 plane, so that the dwell times for the three cases can be calculated using different equations to be used for the three cases.

FIGS. 6(a) to 6(c) show equations for calculating the dwell times of voltage vectors by dividing a total of 12 sectors into three cases. In addition, Table 1 shows the d-q plane, the z1-z2 plane, and the inverse matrix equation according to the prior art, and further shows three cases according to the present disclosure.

As described above, when the switching function within the switching cycle is formed symmetrical, harmonics can be reduced and the number of switching actions (switching frequency) can be minimized. In this case, the dwell times ($T_a$, $T_b$) or ($T_c$, $T_d$) for the switching function may be calculated. Thereafter, '$T_o^{\#1}=T_s-(T_a+T_b)$' or '$T_o^{\#2}=T_s-(T_c+T_d)$' may be calculated to calculate the dwell times of the zero voltage vectors. In addition, $T_s$ is denoted by '$T_s=T_{sw}/2$'. Namely, the voltage modulation period is equal to half of one switching cycle ($T_{sw}$).

However, if the voltage reference vector is moved after fixing the entire coordinate system in the d-q plane and the z1-z2 plane, the inverse matrix must be calculated whenever the voltage reference sector moves from one sector to another sector. If the voltage reference vector moves to another sector, the entire coordinate system is rotated and moved, so that four active voltage vectors for representing the voltage reference vector in the d-q plane can always be located in a first quadrant. At this time, according to the distribution pattern of the corresponding active voltage vectors in the z1-z2 plane, a total of three cases can be used as shown in FIGS. 6(a) to 6(c).

FIG. 6(a) shows that a sector in which the voltage reference vector is currently located is denoted by 3n−2

(where n=1, 2, 3, 4). That is, the sectors of FIG. 6(a) may include a first sector, a fourth sector, a seventh sector, and a tenth sector. FIG. 6(b) shows that a sector in which the voltage reference vector is currently located is denoted by 3n−1 (where n=1, 2, 3, 4). That is, the sectors of FIG. 6(b) may include a second sector, a fifth sector, an eighth sector, and an eleventh sector. FIG. 6(c) shows that a sector in which the voltage reference vector is currently located is denoted by 3n (where n=1, 2, 3, 4). That is, the sectors of FIG. 6(c) may include a third sector, a sixth sector, a ninth sector, and a twelfth sector. The above-described contents shown in FIGS. 6(a) to 6(c) are also included in Table 1.

Referring to the first case shown in Table 1, that is, when a sector in which the voltage reference vector is currently located is denoted by 3n−2 (where, n=1, 2, 3, 4), a total of four active voltage vectors ($V_1^{\#1}$, $V_2^{\#1}$, $V_1^{\#2}$, $V_2^{\#2}$) is required to indicate the voltage reference vector located in the first sector of the d-q plane. If the fourth sector rotates by 90°, the seventh sector rotates by 180°, and the tenth sector rotates by 270°, the voltage reference vector can also be located in the same sector as the first sector. For the z1-z2 plane, a total of four active voltage vectors ($V_1^{\#1}$, $V_2^{\#1}$, $V_1^{\#2}$, $V_2^{\#2}$) is distributed in the z1-z2 plane (see Table 1 or FIG. 6a). At this time, an equation for calculating ($T_a$ and $T_b$) or ($T_c$ and $T_d$) indicating the dwell times of the active voltage vectors ($V_1^{\#1}$, $V_2^{\#1}$, $V_1^{\#2}$, $V_2^{\#2}$) may be represented by Equation 1. In this case, $V_{mi}$ denotes the magnitude of the voltage reference vector, and 'θ' denotes an angle between the voltage reference vector and the d-axis in the counterclockwise direction.

Referring to the second case shown in Table 1, that is, when a sector in which the voltage reference vector is currently located is denoted by 3n−1 (where, n=1, 2, 3, 4), a total of four active voltage vectors ($V_2^{\#1}$, $V_3^{\#1}$, $V_1^{\#2}$, $V_2^{\#2}$) is required to indicate the voltage reference vector in the fourth sector of the d-q plane. If the fourth sector rotates by 90°, the seventh sector rotates by 180°, and the tenth sector rotates by 270°, the voltage reference vector can be located in the same sector as the second sector. In this case, if all active voltage vectors are rotated by 30°, the active voltage vectors ($V_2^{\#1}$, $V_3^{\#1}$, $V_1^{\#2}$, $V_2^{\#2}$) may all be displayed to be located in the first quadrant, so that the result of such vector rotation becomes equal to that of the first case. However, only distribution appearance of four active voltage vectors ($V_2^{\#1}$, $V_3^{\#1}$, $V_1^{\#2}$, $V_2^{\#2}$) in the z1-z2 plane may be changed (see Table 1 or FIG. 6b). Therefore, an equation for calculating ($T_a$ and $T_b$) or ($T_c$ and $T_d$) indicating the dwell times of the active voltage vectors ($V_2^{\#1}$, $V_3^{\#1}$, $V_1^{\#2}$, $V_2^{\#2}$) may be represented by Equation 2.

Referring to the third case shown in Table 1, that is, when a sector in which the voltage reference vector is currently located is denoted by 3n (where, n=1, 2, 3, 4), a total of four active voltage vectors ($V_2^{\#1}$, $V_3^{\#1}$, $V_2^{\#2}$, $V_3^{\#2}$) is required to indicate the voltage reference vector in the third sector of the d-q plane. If the sixth sector rotates by 90°, the ninth sector rotates by 180°, and the twelfth sector rotates by 270°, the voltage reference vector can be located in the same sector as the third sector. In this case, if all active voltage vectors are rotated by 60°, the active voltage vectors ($V_2^{\#1}$, $V_3^{\#1}$, $V_2^{\#2}$, $V_3^{\#2}$) may all be displayed to be located in the first quadrant. However, only distribution appearance of four active voltage vectors ($V_2^{\#1}$, $V_3^{\#1}$, $V_2^{\#2}$, $V_3^{\#2}$) in the z1-z2 plane may be changed (see Table 1 or FIG. 6c). Therefore, an equation for calculating ($T_a$ and $T_b$) or ($T_c$ and $T_d$) indicating the dwell times of the active voltage vectors ($V_2^{\#1}$, $V_3^{\#1}$, $V_3^{\#2}$, $V_3^{\#2}$) may be represented by Equation 3.

In the second case and the third case, the active voltage vectors are eventually disposed at the same positions in the d-q plane through rotation thereof, and three matrices denoted by Equations 1 to 3 have the same values in first and second columns, but have different values in third and fourth columns. This is because only values of the z1-z2 plane are changed in the second and third cases shown in Table 1.

As described above, voltage reference vectors of 12 sectors can be classified into the above three cases shown in Table 1. As a result, if only three matrices are stored in advance in a storage unit (e.g., a ROM) of the inverter unit, a necessary dwell time can be immediately calculated using the three matrices without the need to calculate the inverse matrix every time. As a result, the amount of calculation can be reduced, resulting in a shortened calculation time.

Figure 7:
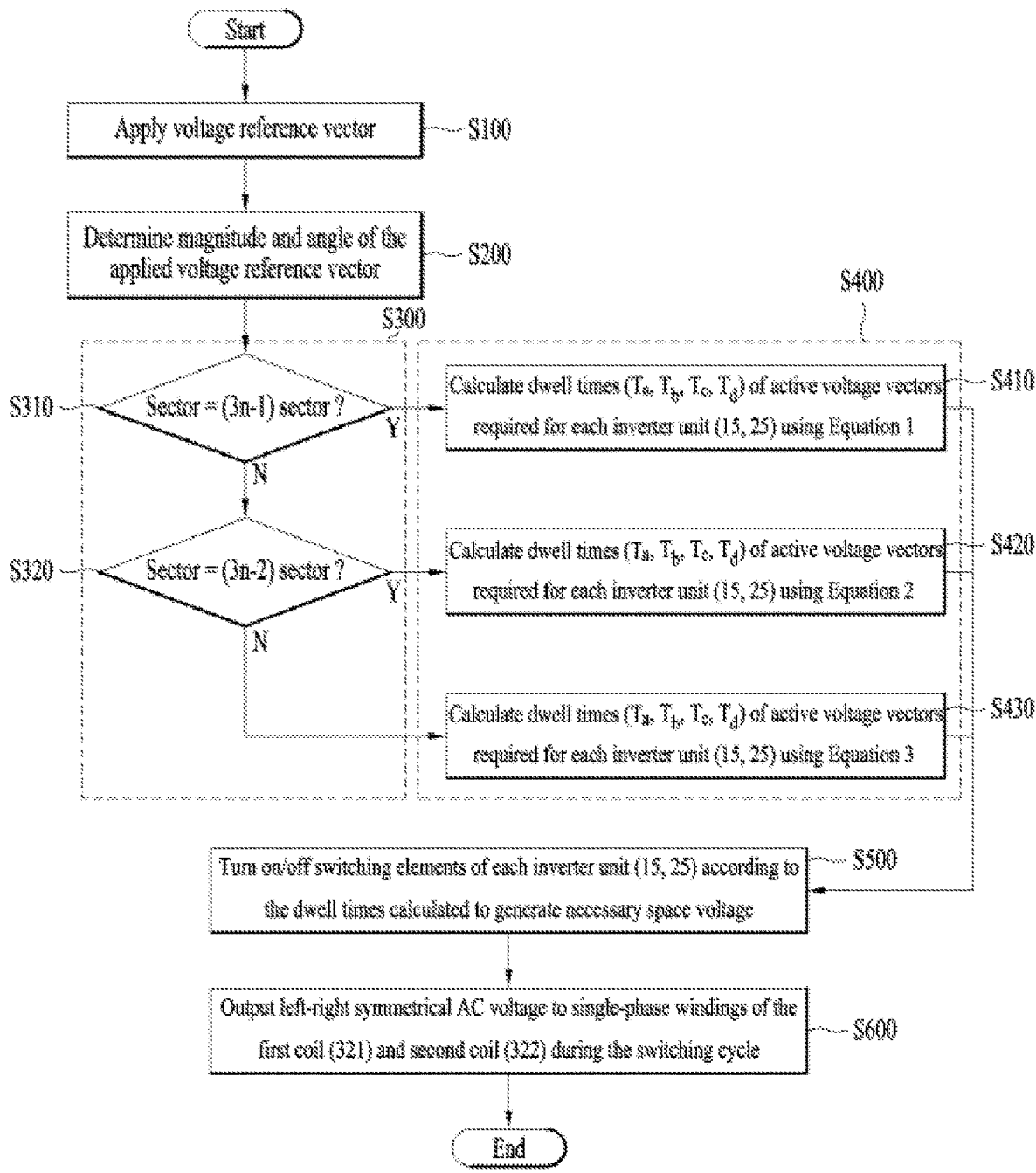
FIG. 7 is a flowchart illustrating a method for determining a dwell time for each space voltage vector in each of three cases according to which sector includes a voltage reference vector.

FIG. 7 is a flowchart illustrating a control method for calculating the dwell time using the above-described equations, and shows that the switching patterns for turning on and off the switching element on each phase by the first inverter 15 and the second inverter 25 included in the motor assembly are symmetrically formed during the switching cycle.

Referring to FIG. 7, according to the control method of the present disclosure, a voltage reference vector based on a space vector pulse width modulation (SVPWM) method is first applied to the motor (S100). The first inverter unit 15 and the second inverter unit 25 may determine the magnitude and angle of the applied voltage reference vector (S200), and may determine a sector in which the voltage reference vector is currently located (S300). According to the above-described three cases of Table 1, two active voltage vectors adjacent to the voltage reference vector are calculated in each of the first space voltage vector and the second space voltage vector using the equations prestored for the above three cases (S400). Accordingly, after calculating the dwell times of the zero voltage vectors, the switching elements of the respective phases of the inverter units 15 and 25 are turned on or off using the dwell time of each space voltage vector (S500).

As described above, since the voltage reference vector is created using two active voltage vectors in the first space voltage vector of the first inverter unit, and two active voltage vectors in the second space voltage vector, the switching function for each phase for turning on or off the switching units may be formed symmetrically in a horizontal direction within one switching cycle.

Accordingly, the AC voltage of each phase applied to the first coil and the second coil can also be output to have a left-right symmetrical pattern within each switching cycle (S600).

In step S200 for determining the magnitude and angle of the applied voltage reference vector and step S300 for determining a sector in which the voltage reference vector is currently located, although FIG. 7 exemplarily shows that the sector is determined to correspond to '3n' when the sector does not correspond to 3n−1 and 3n−2, the scope of the present disclosure is not limited thereto, and it should be noted that the present disclosure can also be applied to all cases in which the sector including the voltage reference vector can be distinguished from other sectors. Alternatively, it is determined whether the sector corresponds to 3n and 3n−2. In this case, if the sector does not correspond to 3n and 3n−2, it may also be determined that the voltage reference vector is located at the sector (3n−1). If it is possible to determine a current rotor position using a position sensor, the corresponding sector can also be determined through such position sensor.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

The invention claimed is:

1. A motor assembly comprising:

a stator having a plurality of slots;

a first coil and a second coil isolated from the first coil, each of which is wound on each of the plurality of slots such that three-phase alternating currents are applied thereto;

a rotor configured to rotate by rotation magnetic fields generated by the first coil and the second coil;

a first inverter unit configured to control the three-phase alternating current that is applied to the first coil in order to generate the rotation magnetic field; and a second inverter unit configured to control the three-phase alternating current that is applied to the second coil in order to generate the rotation magnetic field, wherein the first inverter unit and the second inverter unit are configured such that control signals for turning on or off each three-phase alternating current applied to each of the first coil and the second coil during a preset switching cycle such that a first half of the switching cycle is the same as a second half of the switching cycle, wherein the first inverter unit and the second inverter unit are configured to apply a voltage reference vector based on space vector pulse width modulation (SVPWM) control, determine a magnitude and angle of the voltage reference vector in a d-q plane, determine a sector in which the voltage reference vector is currently located by referring to the angle of the voltage reference vector, from among 12 sectors distinguished from each other by a first space voltage vector of the first inverter unit and a second space voltage vector of the second inverter unit in the d-q plane, calculate, when the voltage reference vector is located at a point corresponding to a (3n−1)-th sector (where, n=1, 2, 3, 4), dwell times of two active voltage vectors from among the first space voltage vectors and dwell times of two active voltage vectors from among the second space voltage vectors by referring to Equation 1, calculate, when the voltage reference vector is located at a point corresponding to a (3n−2)-th sector (where, n=1, 2, 3, 4), dwell times of two active voltage vectors from among the first space voltage vectors and dwell times of two active voltage vectors from among the second space voltage vectors by referring to Equation 2, calculate, when the voltage reference vector is located at a point corresponding to a (3n)-th sector (where, n=1, 2, 3, 4), dwell times of two active voltage vectors from among the first space voltage vectors and dwell times of two active voltage vectors from among the second space voltage vectors by referring to Equation 3, and turn on or off the switching unit of the first inverter unit and the switching unit of the second inverter unit in order to generate space voltage vectors required for the calculated dwell times, $$\begin{bmatrix} T_a \\ T_b \\ T_c \\ T_d \end{bmatrix} = \begin{bmatrix} \frac{1}{2} & -\frac{\sqrt{3}}{6} & \frac{1}{2} & \frac{\sqrt{3}}{6} \\ \frac{\sqrt{3}}{3} & 0 & -\frac{\sqrt{3}}{3} & 0 \\ 0 & \frac{\sqrt{3}}{3} & 0 & -\frac{\sqrt{3}}{3} \\ -\frac{\sqrt{3}}{6} & \frac{1}{2} & \frac{\sqrt{3}}{6} & \frac{1}{2} \end{bmatrix} \begin{bmatrix} V_{mi}\cos\theta \\ V_{mi}\sin\theta \\ 0 \\ 0 \end{bmatrix} \quad \text{[Equation 1]}$$

$$\begin{bmatrix} T_a \\ T_b \\ T_c \\ T_d \end{bmatrix} = \begin{bmatrix} \frac{1}{2} & -\frac{\sqrt{3}}{6} & -\frac{1}{2} & \frac{\sqrt{3}}{6} \\ \frac{\sqrt{3}}{3} & 0 & \frac{\sqrt{3}}{6} & -\frac{1}{2} \\ 0 & \frac{\sqrt{3}}{3} & \frac{1}{2} & -\frac{\sqrt{3}}{6} \\ -\frac{\sqrt{3}}{6} & \frac{1}{2} & -\frac{\sqrt{3}}{3} & 0 \end{bmatrix} \begin{bmatrix} V_{mi}\cos\theta \\ V_{mi}\sin\theta \\ 0 \\ 0 \end{bmatrix} \quad \text{[Equation 2]}$$

$$\begin{bmatrix} T_a \\ T_b \\ T_c \\ T_d \end{bmatrix} = \begin{bmatrix} \frac{1}{2} & -\frac{\sqrt{3}}{6} & 0 & -\frac{\sqrt{3}}{3} \\ \frac{\sqrt{3}}{3} & 0 & -\frac{\sqrt{3}}{6} & \frac{1}{2} \\ 0 & \frac{\sqrt{3}}{3} & -\frac{1}{2} & \frac{\sqrt{3}}{6} \\ -\frac{\sqrt{3}}{6} & \frac{1}{2} & \frac{\sqrt{3}}{6} & -\frac{1}{2} \end{bmatrix} \begin{bmatrix} V_{mi}\cos\theta \\ V_{mi}\sin\theta \\ 0 \\ 0 \end{bmatrix} \quad \text{[Equation 3]}$$

where, Vmi denotes a magnitude of the voltage reference vector, θ denotes an angle between the voltage reference vector and a d-axis, Ta and Tb indicate dwell times (in units of "sec") of two active voltage vectors adjacent to the voltage reference vector from among the first space voltage vectors, and Tc and Td indicate dwell times (in units of "sec") of two active voltage vectors adjacent to the voltage reference vector from among the second space voltage vectors.

2. The motor assembly according to claim 1, wherein:

the second coil has a phase difference of 30 degrees or −30 degrees with respect to the first coil.

3. The motor assembly according to claim 2, further comprising:

a first winding, a second winding, and a third winding, each of which is configured to receive each single-phase alternating current of each of the three-phase alternating currents applied to the first coil and the second coil, wherein one winding is disposed in each of the plurality of slots; and single-phase windings of the first coil and the second coil are alternately arranged in the plurality of slots in a manner that the single-phase windings corresponding to each other are alternately arranged in the plurality of slots.

4. The motor assembly according to claim 1, wherein:

each of the first inverter unit and the second inverter unit includes a first-phase switching unit, a second-phase switching unit, and a third-phase switching unit, each of which applies one single-phase alternating current from among three-phase alternating currents to a corresponding winding; and the control signals are signals for turning on or off the first-phase switching unit, the second-phase switching unit, and the three-phase switching element according to a space vector pulse width modulation scheme.

5. The motor assembly according to claim 4, wherein:
voltages, which are applied to single-phase windings of the first coil and the second coil according to on/off states of the first-phase switching unit, the second-phase switching unit, and the third-phase switching unit during the switching cycle such that the first half of the switching cycle is the same as the second half of the switching cycle.

6. The motor assembly according to claim 4, wherein:
the voltage reference vector for rotating the rotor is formed using two active voltage vectors and two zero voltage vectors that are adjacent to the voltage reference vector in each of a first space voltage vector indicating a space vector of the first inverter unit and a second space voltage vector indicating a space vector of the second inverter unit.

7. The motor assembly according to claim 6, wherein:
in the first space voltage vector,
a half of a sum of a first dwell time, a second dwell time and a third dwell time is equal to a half of the switching cycle, wherein each of the first dwell time and the second dwell time is a time for which two active voltage vectors adjacent to the voltage reference vector are respectively applied, and the third dwell time is a time for which the zero voltage vectors are applied.

8. The motor assembly according to claim 7, wherein:
the control signals, which are configured to turn on or off the first-phase switching unit of the first inverter unit, the second-phase switching unit of the first inverter unit, and the third-phase switching unit of the first inverter unit according to the first dwell time, the second dwell time, and the third dwell time with respect to a point corresponding to a half of the switching cycle during the switching cycle such that the first half of the switching cycle is the same as the second half of the switching cycle.

9. The motor assembly according to claim 7, wherein:
voltages, which are applied to windings for each phase of the first coil and the second coil in response to control signals for turning on or off the first-phase switching unit, the second-phase switching unit, and the third-phase switching unit according to the first dwell time, the second dwell time, and the third dwell time with respect to a point corresponding to a half of the switching cycle during the switching cycle such that the first half of the switching cycle is the same as the second half of the switching cycle.

10. The motor assembly according to claim 6, wherein:
in the second space voltage vector,
a half of a sum of a fourth dwell time, a fifth dwell time and a third sixth time is equal to a half of the switching cycle, wherein each of the fourth dwell time and the fifth dwell time is a time for which two active voltage vectors adjacent to the voltage reference vector are respectively applied, and the sixth dwell time is a time for which the zero voltage vectors are applied.

11. The motor assembly according to claim 10, wherein:
the control signals, which are configured to turn on or off the first-phase switching unit of the second inverter unit, the second-phase switching unit of the second inverter unit, and the third-phase switching unit of the second inverter unit according to the fourth dwell time, the fifth dwell time, and the sixth dwell time during the switching cycle such that the first half of the switching cycle is the same as the second half of the switching cycle.

12. The motor assembly according to claim 10, wherein:
voltages, which are applied to windings for each phase of the first coil and the second coil in response to control signals for turning on or off the first-phase switching unit, the second-phase switching unit, and the third-phase switching unit according to the fourth dwell time, the fifth dwell time, and the sixth dwell time during the switching cycle such that the first half of the switching cycle is the same as the second half of the switching cycle.

13. A method for controlling a motor assembly which includes a stator having a plurality of slots, a first coil and a second coil isolated from the first coil, each of which is wound on each of the plurality of slots such that three-phase alternating currents are applied thereto, a rotor configured to rotate by rotation magnetic fields generated by the first coil and the second coil, a first inverter unit configured to control the three-phase alternating current that is applied to the first coil in order to generate the rotation magnetic field, and a second inverter unit configured to control the three-phase alternating current that is applied to the second coil in order to generate the rotation magnetic field, wherein the first inverter unit and the second inverter unit are configured such that control signals for turning on or off each three-phase alternating current applied to each of the first coil and the second coil during a preset switching cycle such that a first half of the switching cycle is the same as a second half of the switching cycle, the method comprising:

applying a voltage reference vector based on space vector pulse width modulation (SVPWM) control, determining a magnitude and angle of the voltage reference vector in a d-q plane;

determining a sector in which the voltage reference vector is currently located by referring to the angle of the voltage reference vector, from among 12 sectors distinguished from each other by a first space voltage vector of the first inverter unit and a second space voltage vector of the second inverter unit in the d-q plane;

calculating, when the voltage reference vector is located at a point corresponding to a (3n−1)-th sector (where, n=1, 2, 3, 4), dwell times of two active voltage vectors from among the first space voltage vectors and dwell times of two active voltage vectors from among the second space voltage vectors by referring to Equation 1;

calculating, when the voltage reference vector is located at a point corresponding to a (3n−2)-th sector (where, n=1, 2, 3, 4), dwell times of two active voltage vectors from among the first space voltage vectors and dwell times of two active voltage vectors from among the second space voltage vectors by referring to Equation 2; and calculating, when the voltage reference vector is located at a point corresponding to a (3n)-th sector (where, n=1, 2, 3, 4), dwell times of two active voltage vectors from among the first space voltage vectors and dwell times of two active voltage vectors from among the second space voltage vectors by referring to Equation 3; and turning on or off the switching unit of the first inverter unit and the switching unit of the second inverter unit in order to generate space voltage vectors required for the calculated dwell times,

[Equation 1]
$$\begin{bmatrix} T_a \\ T_b \\ T_c \\ T_d \end{bmatrix} = \begin{bmatrix} \frac{1}{2} & -\frac{\sqrt{3}}{6} & \frac{1}{2} & \frac{\sqrt{3}}{6} \\ \frac{\sqrt{3}}{3} & 0 & -\frac{\sqrt{3}}{3} & 0 \\ 0 & \frac{\sqrt{3}}{3} & 0 & -\frac{\sqrt{3}}{3} \\ -\frac{\sqrt{3}}{6} & \frac{1}{2} & \frac{\sqrt{3}}{6} & \frac{1}{2} \end{bmatrix} \begin{bmatrix} V_{mi}\cos\theta \\ V_{mi}\sin\theta \\ 0 \\ 0 \end{bmatrix}$$

[Equation 2]
$$\begin{bmatrix} T_a \\ T_b \\ T_c \\ T_d \end{bmatrix} = \begin{bmatrix} \frac{1}{2} & -\frac{\sqrt{3}}{6} & -\frac{1}{2} & \frac{\sqrt{3}}{6} \\ \frac{\sqrt{3}}{3} & 0 & \frac{\sqrt{3}}{6} & -\frac{1}{2} \\ 0 & \frac{\sqrt{3}}{3} & 0 & \frac{\sqrt{3}}{6} \\ -\frac{\sqrt{3}}{6} & \frac{1}{2} & -\frac{\sqrt{3}}{3} & 0 \end{bmatrix} \begin{bmatrix} V_{mi}\cos\theta \\ V_{mi}\sin\theta \\ 0 \\ 0 \end{bmatrix}$$

[Equation 3]
$$\begin{bmatrix} T_a \\ T_b \\ T_c \\ T_d \end{bmatrix} = \begin{bmatrix} \frac{1}{2} & -\frac{\sqrt{3}}{6} & 0 & -\frac{\sqrt{3}}{3} \\ \frac{\sqrt{3}}{3} & 0 & \frac{\sqrt{3}}{6} & \frac{1}{2} \\ 0 & \frac{\sqrt{3}}{3} & -\frac{1}{2} & \frac{\sqrt{3}}{6} \\ -\frac{\sqrt{3}}{6} & \frac{1}{2} & \frac{\sqrt{3}}{6} & -\frac{1}{2} \end{bmatrix} \begin{bmatrix} V_{mi}\cos\theta \\ V_{mi}\sin\theta \\ 0 \\ 0 \end{bmatrix}$$

where, Vmi denotes a magnitude of the voltage reference vector, θ denotes an angle between the voltage reference vector and a d-axis, Ta and Tb indicate dwell times (in units of "sec") of two active voltage vectors adjacent to the voltage reference vector from among the first space voltage vectors, and Tc and Td indicate dwell times (in units of "sec") of two active voltage vectors adjacent to the voltage reference vector from among the second space voltage vectors.

14. The method according to claim 13, wherein:

the dwell time of the zero voltage vector from among the first space voltage vectors is a time period obtained by subtracting, from the switching cycle, a time cycle corresponding to twice the sum of two dwell times required for two active voltage vectors from among the first space voltage vectors.

15. The method according to claim 14, wherein:

the dwell time of the zero voltage vector from among the second space voltage vectors is a time period obtained by subtracting, from the switching cycle, a time cycle corresponding to twice the sum of two dwell times required for two active voltage vectors from among the second space voltage vectors.

* * * * *